US011886160B2

(12) United States Patent
Ishimura

(10) Patent No.: US 11,886,160 B2
(45) Date of Patent: Jan. 30, 2024

(54) WORK SUPPORT SYSTEM, INFORMATION PROCESSOR, AND WORK SUPPORT METHOD

(71) Applicant: OMRON CORPORATION, Kyoto (JP)

(72) Inventor: Akihiro Ishimura, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 347 days.

(21) Appl. No.: 17/424,739

(22) PCT Filed: Jan. 29, 2020

(86) PCT No.: PCT/JP2020/003094
§ 371 (c)(1),
(2) Date: Jul. 21, 2021

(87) PCT Pub. No.: WO2020/162276
PCT Pub. Date: Aug. 13, 2020

(65) Prior Publication Data
US 2022/0011736 A1 Jan. 13, 2022

(30) Foreign Application Priority Data

Feb. 7, 2019 (JP) .................................. 2019-020259

(51) Int. Cl.
*G05B 19/05* (2006.01)
*G06Q 10/0631* (2023.01)
*G06Q 10/0639* (2023.01)

(52) U.S. Cl.
CPC ......... *G05B 19/058* (2013.01); *G05B 19/054* (2013.01); *G06Q 10/06312* (2013.01);
(Continued)

(58) Field of Classification Search
None
See application file for complete search history.

(56) References Cited

U.S. PATENT DOCUMENTS 10,062,042 B1 8/2018 Kelly et al.

FOREIGN PATENT DOCUMENTS

| CN | 102385733 A | 3/2012 |
| JP | 2000-214905 A | 8/2000 |

(Continued)

OTHER PUBLICATIONS

Extended European Search Report dated Sep. 29, 2022 in European Application No. 20751929.9.

(Continued)

*Primary Examiner* — Sean Shechtman
(74) *Attorney, Agent, or Firm* — Sughrue Mion, PLLC

(57) ABSTRACT

Upon receipt of a signal indicating occurrence of anomalies, an information processor displays the nature of the anomalies. The information processor accepts for each anomaly, an input operation for assignment of a worker who is to handle an anomaly. Based on the assignment, the information processor notifies a terminal device of the worker of the nature of the anomaly to be handled by the worker. The terminal device displays contents of a remedy for the anomaly. The terminal device transmits progress information to the information processor. The information processor displays the progress information. The information processor further accepts an input operation for updating the assignment of a worker who is to handle the anomaly. Based on the assignment updated, the information processor notifies the terminal device of the worker of the nature of the anomaly to be handled by the worker.

12 Claims, 32 Drawing Sheets

(52) U.S. Cl.
CPC .............. *G06Q 10/06398* (2013.01); *G05B 2219/14044* (2013.01); *G05B 2219/14057* (2013.01); *G05B 2219/14087* (2013.01)

(56) References Cited

FOREIGN PATENT DOCUMENTS

| | | |
|---|---|---|
| JP | 2014-178932 A | 9/2014 |
| JP | 2015-75918 A | 4/2015 |
| JP | 2017-27155 A | 2/2017 |
| JP | 2018-112940 A | 7/2018 |
| WO | 2016/103357 A1 | 6/2016 |
| WO | 2018/187308 A1 | 10/2018 |
| WO | 2019/017061 A1 | 1/2019 |

OTHER PUBLICATIONS

Communication dated Dec. 7, 2021 from the Japanese Patent Office in Application No. 2019-020259.
Office Action dated Jun. 1, 2023 in Chinese Application No. 202080010079.X.
Written Opinion for PCT/JP2020/003094, dated Mar. 24, 2020.
International Search report for PCT/JP2020/003094, dated Mar. 24, 2020.

FIG.8

| No. | DATE AND TIME OF OCCURRENCE | NATURE OF ANOMALY | DEGREE OF EMERGENCY (A>B>C>D) | REMEDY METHOD | REPEAT | STATUS | ASSIGNMENT OF WORKER | IDEAL WORK TIME | ESTIMATED WORK TIME |
|---|---|---|---|---|---|---|---|---|---|
| 1 | ○/○ | MISMATCH | C | SEE DETAILS | YES | NOT YET | NOT YET | | |
| 2 | ○/○ | THERE IS AN UNRECOGNIZED DEVICE | C | SEE DETAILS | YES | NOT YET | NOT YET | | |
| 3 | ○/○ | FAULTY DEVICE | A | INQUIRE OF MANUFACTURER | NO | NOT YET | NOT YET | | |
| 4 | ○/○ | FAULTY WORKPIECE | A | INQUIRE OF VENDOR | NO | NOT YET | NOT YET | | |

TROUBLE LIST

NOT YET | DOING | DONE

FIG.9

| No. | DATE AND TIME OF OCCURRENCE | NATURE OF ANOMALY | DEGREE OF EMERGENCY (A>B>C>D) | REMEDY METHOD | REPEAT | STATUS | ASSIGNMENT OF WORKER | IDEAL WORK TIME | ESTIMATED WORK TIME |
|---|---|---|---|---|---|---|---|---|---|
| 1 | ○/○ | MISMATCH | C | SEE DETAILS | YES | NOT YET | NOT YET | 10 MINUTES | |
| 2 | ○/○ | THERE IS AN UNRECOGNIZED DEVICE | C | SEE DETAILS | YES | NOT YET | NOT YET | 15 MINUTES | |
| 3 | ○/○ | FAULTY DEVICE | A | INQUIRE OF MANUFACTURER | NO | NOT YET | NOT YET | 15 MINUTES | |
| 4 | ○/○ | FAULTY WORKPIECE | A | INQUIRE OF VENDOR | NO | NOT YET | NOT YET | 20 MINUTES | |

NOT YET | DOING | DONE

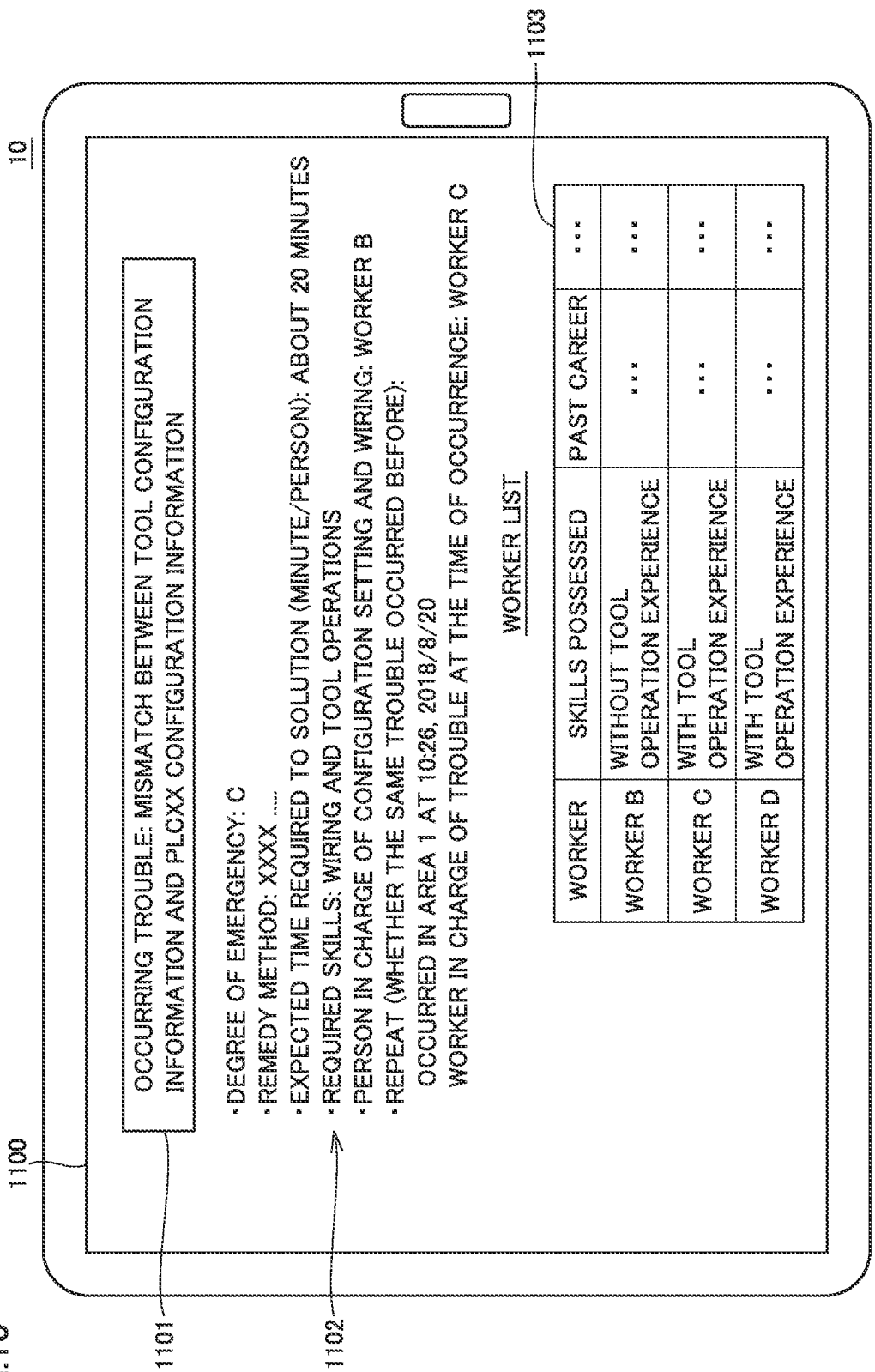

FIG.11

TROUBLE LIST

| No. | DATE AND TIME OF OCCURRENCE | NATURE OF ANOMALY | DEGREE OF EMERGENCY (A>B>C>D) | REMEDY METHOD | REPEAT | STATUS | ASSIGNMENT OF WORKER | IDEAL WORK TIME | ESTIMATED WORK TIME |
|---|---|---|---|---|---|---|---|---|---|
| 1 | ○/○ | MISMATCH | C | SEE DETAILS | YES | NOT YET | NOT YET | 10 MINUTES | 8 MINUTES |
| 2 | ○/○ | THERE IS AN UNRECOGNIZED DEVICE | C | SEE DETAILS | YES | NOT YET | NOT YET | 15 MINUTES | 10 MINUTES |
| 3 | ○/○ | FAULTY DEVICE | A | INQUIRE OF MANUFACTURER | NO | NOT YET | NOT YET | 15 MINUTES | 15 MINUTES |
| 4 | ○/○ | FAULTY WORKPIECE | A | INQUIRE OF VENDOR | NO | NOT YET | NOT YET | 20 MINUTES | 14 MINUTES |

NOT YET / DOING / DONE

FIG.17

TROUBLE LIST

| No. | DATE AND TIME OF OCCURRENCE | NATURE OF ANOMALY | STATUS | ASSIGNMENT OF WORKERS | IDEAL WORK TIME | ESTIMATED WORK TIME | DEGREE OF PROGRESS OF EACH WORK |
|---|---|---|---|---|---|---|---|
| 1 | ○/○ | MISMATCH | DOING | WORKER A WORKER B | 10 MINUTES | 8 MINUTES | 20% (15 MINUTES BEHIND SCHEDULE) |
| 2 | ○/○ | THERE IS AN UNRECOGNIZED DEVICE | DONE | WORKER B | 15 MINUTES | 10 MINUTES | 100% |
| 3 | ○/○ | COMMUNICATION ERROR | DOING | WORKER D | 15 MINUTES | 15 MINUTES | 60% (5 MINUTES BEHIND SCHEDULE) |
| 4 | ○/○ | FAULTY WORKPIECE | DOING | WORKER E | 20 MINUTES | 14 MINUTES | 70% (10 MINUTES BEHIND SCHEDULE) |

NOT YET / DOING / DONE

TROUBLE LIST

| No. | DATE AND TIME OF OCCURRENCE | NATURE OF ANOMALY | DEGREE OF EMERGENCY (A>B>C>D) | REMEDY METHOD | REPEAT | STATUS | ASSIGNMENT OF WORKER | IDEAL WORK TIM | ESTIMATED WORK TIME |
|---|---|---|---|---|---|---|---|---|---|
| 1 | ○/○ | MISMATCH | C | SEE DETAILS | YES | DONE | WORKER A / WORKER B | 10 MINUTES / 15 MINUTES | 8 MINUTES / 11 MINUTES |
| 2 | ○/○ | THERE IS AN UNRECOGNIZED DEVICE | C | SEE DETAILS | YES | DONE | WORKER B | 15 MINUTES | 10 MINUTES |
| 3 | ○/○ | COMMUNICATION ERROR | A | INQUIRE OF MANUFACTURER | NO | DOING | MANAGER | 15 MINUTES | 15 MINUTES |
| 4 | ○/○ | FAULTY WORKPIECE | A | INQUIRE OF VENDOR | NO | DOING | WORKER E | 20 MINUTES | 14 MINUTES |

NOT YET / DOING / DONE

FIG.29

| ANOMALY IDENTIFICATION No. | NATURE OF ANOMALY | DEGREE OF EMERGENCY | REMEDY METHOD | ... |
|---|---|---|---|---|
| 00001 | FAULTY WORKPIECE | A | ... | ... |
| 00002 | FAULTY DEVICE | A | ... | ... |
| 00003 | ... | B | ... | ... |
| 00004 | ... | B | ... | ... |
| 00005 | ... | A | ... | ... |
| 00006 | MISMATCH | C | ... | ... |
| ... | ... | ... | ... | ... |

FIG.30

| ANOMALY IDENTIFICATION No. | IDEAL WORK TIME |
|---|---|
| 00001 | 20 MINUTES |
| 00002 | 15 MINUTES |
| 00003 | ... |
| 00004 | ... |
| 00005 | ... |
| 00006 | 10 MINUTES |
| ... | ... |

| WORKER | SKILL POSSESSED | PAST CAREER | ... |
|---|---|---|---|
| WORKER A | WITHOUT TOOL OPERATION EXPERIENCE | ... | ... |
| WORKER B | WITHOUT TOOL OPERATION EXPERIENCE | ... | ... |
| WORKER C | WITH TOOL OPERATION EXPERIENCE | ... | ... |
| WORKER D | WITH TOOL OPERATION EXPERIENCE | ... | ... |
| ... | ... | ... | ... |

FIG.32

| ANOMALY IDENTIFICATION No. | DATA OF OCCURRENCE | CONTENTS OF REMEDY | WORKER IN CHARGE | REQUIRED TIME | ... |
|---|---|---|---|---|---|
| 00032 | 20190110 | ... | A | 8 MINUTES | ... |
| 00141 | ... | ... | ... | ... | ... |
| 01108 | ... | ... | ... | ... | ... |
| 00542 | ... | ... | ... | ... | ... |
| ... | ... | ... | ... | ... | ... |

WORK SUPPORT SYSTEM, INFORMATION PROCESSOR, AND WORK SUPPORT METHOD

CROSS REFERENCE TO RELATED APPLICATIONS

This application is a National Stage of International Application No. PCT/JP2020/003094 filed Jan. 29, 2020, claiming priority based on Japanese Patent Application No. 2019-020259 filed Feb. 7, 2019, the entire contents of each of which being herein incorporated by reference in their entireties.

TECHNICAL FIELD

The present invention relates to a work support system, an information processor, and a work support method.

BACKGROUND ART

In the event of a plurality of anomalies (failures, errors, etc.) in a production facility of a production line, workers need to be assigned to the respective anomalies (specifically, work to handle an anomaly) in order to rapidly recover from such anomalies.

For example, Japanese Patent Laying-Open No. 2018-112940 (PTL 1) discloses a worker assignment device that performs such assignment. The worker assignment device includes a receiving unit, a specification unit, an acquisition unit, and an output unit (see "Abstract"). The receiving unit receives information on the occurrence of an error from a production device in which the error has occurred among a plurality of production devices. The specification unit specifies a worker who can perform error handling work. The acquisition unit obtains, when a plurality of workers have been specified, a time required for each of the specified workers to travel to the production device in which the error has occurred and a time required for each of the specified workers to perform the error handling work. The output unit determines a worker who is to perform the error handling work from among the specified workers based on an acquisition result of the acquisition unit, and outputs the determined worker.

CITATION LIST

Patent Literature

PTL 1: Japanese Patent Laying-Open No. 2018-112940

SUMMARY OF INVENTION

Technical Problem

The work to recover from an anomaly is performed with manual intervention, and such work does not always proceed as planned. Damage increases if recovery delays, and accordingly, early recovery is desired.

In this respect, the worker assignment device of PTL 1 automatically assigns a worker to work based on a pre-installed program, but does not review the assignment to the work. In the use of this worker assignment device, thus, if progress delays in part of the work, a longer-than-expected time may be required to complete the entire work.

The present disclosure has been made in view of the above problem, and an object thereof is to provide a work support system, an information processor, and a work support method that enable rapid recovery from each anomaly in the event of a plurality of anomalies.

Solution to Problem

According to an aspect of the present disclosure, a work support system includes a controller system of a production facility, an information processor communicable with the controller system, and a plurality of first terminal devices, each of which is communicable with the information processor. Upon receipt of a signal indicating occurrence of a plurality of anomalies in the controller system from the controller system, the information processor displays nature of the plurality of anomalies. After displaying the nature of the plurality of anomalies, the information processor accepts, for each anomaly, an input operation for assignment of a worker who is to handle the anomaly among a plurality of workers. Upon acceptance of the input operation, the information processor notifies, based on the assignment, a first terminal device used by the worker of nature of the anomaly to be handled by the worker. Upon acceptance of the nature of the anomaly from the information processor, each first terminal device displays contents of a remedy for the anomaly. Upon acceptance of an input operation for inputting progress information indicating progress of the remedy, each first terminal device transmits the progress information to the information processor. Upon receipt of the progress information from the first terminal device, the information processor displays the progress information. After displaying the progress information, the information processor further accepts an input operation for updating the assignment of a worker who is to handle each anomaly. Based on the assignment updated, the information processor notifies the first terminal device used by the worker of the nature of the anomaly to be handled by the worker.

The above configuration enables, in the event of a plurality of anomalies, rapid recover from each anomaly.

Preferably, the information processor displays support information for supporting the assignment of a worker. The support information includes at least one of location information of each worker, skill information indicating a skill of each worker, experience information indicating work experience of each worker, occurrence location information indicating a location of occurrence of each anomaly, a degree of emergency of each anomaly, and an ideal number of workers required for handling each anomaly.

The above configuration enables appropriate assignment.

Preferably, the controller system includes a programmable logic controller. The information processor includes a server device communicably connected to the programmable logic controller and each first terminal device, and a second terminal device communicable with the server device. The second terminal device further accepts an input operation for setting a target time to recover from the plurality of anomalies that have occurred in the controller system. The server device stores the support information and ideal time information indicating, for each anomaly, an ideal work time to recover from the anomaly. The server device determines, based on the ideal time information, whether or not work to recover from the plurality of anomalies that have occurred in the controller system is to complete within the target time set in the second terminal device. The second terminal device displays a result of the determination by the server device.

The above configuration allows the user of the second terminal device to preliminarily learn whether or not the work to recover from a plurality of anomalies will complete within the target completion time set by the second terminal device.

Preferably, when it is determined that the work to recover from the plurality of anomalies is not to complete within the target time, the second terminal device further accepts an input operation for changing the assignment of a worker.

The above configuration allows the user of the second terminal device to attempt to perform such assignment as to complete a recovery operation within the target completion time.

Preferably, based on required time information indicating a time required for each worker to arrive at the location of occurrence of the anomaly and the ideal time information, the server device determines whether or not the work to recover from the plurality of anomalies that have occurred in the controller system is to complete within the target time.

The above configuration allows the user of the second terminal device to learn whether or not the work to recover from the plurality of anomalies will complete within the target completion time by causing the second terminal device to display a result of the determination.

Preferably, the first terminal device displays the ideal work time required for recovering, by the worker who uses the first terminal device, from the anomaly to be handled by the worker.

The above configuration allows the worker to have a goal for the work completion time.

Preferably, upon acceptance of the nature of the anomaly from the information processor, the first terminal device performs a display for inquiring of the worker whether or not the worker is able to handle the anomaly. Upon input of a response to the inquiry, the first terminal device transmits the response to the information processor. The information processor displays the response.

The above configuration allows the user of the second terminal device to perform the assignment work reflecting the worker's intention.

Preferably, the information processor displays a list of the plurality of anomalies. The information processor determines, based on the progress information, whether or not recovery from each anomaly has been performed. In displaying of the list, the information processor displays items for the anomaly, recovery from which is determined to have been performed, differently from items for the anomaly, recovery from which is determined to have not been performed.

The above configuration allows the user of the second terminal device to immediately distinguish between an anomaly, recovery from which has been performed, and an anomaly, no recovery from which has been performed.

Preferably, each first terminal device displays a text box for transmitting a message. Each first terminal device transmits the message input in the text box to the information processor.

The above configuration allows the worker to use the first terminal device to communicate what the worker wants to convey to the work supervisor.

Preferably, each first terminal device displays contents of remedies for the anomalies in a form of a checklist. The input operation for inputting the progress information is a check operation to the checklist.

The above configuration allows the worker to notify the user of the second terminal device of the progress information.

According to another aspect of the present disclosure, an information processor is communicable with a controller system of a production facility, and a plurality of terminal devices. The information processor includes: receiving means configured to receive, from the controller system, a signal indicating occurrence of a plurality of anomalies in the controller system; display means configured to display nature of the plurality of anomalies; acceptance means configured to accept, for each anomaly, an input operation for assignment of a worker who is to handle the anomaly among a plurality of workers after the display of the nature of the plurality of anomalies; and transmission means configured to notify, upon acceptance of the input operation and based on the assignment, a terminal devices used by the worker of nature of the anomaly to be handled by the worker. The receiving means further receives progress information indicating progress of a remedy for the anomaly from each terminal device. Upon receipt of the progress information, the display means displays the progress information. The acceptance means further accepts, after displaying the progress information, an input operation for updating the assignment of a worker who is to handle each anomaly. Based on the assignment updated, the transmission means notifies the terminal device used by the worker of the nature of the anomaly to be handled by the worker.

The above configuration enables rapid recovery from each anomaly in the event of a plurality of anomalies.

According to still another aspect of the present disclosure, a work support method includes the steps of: upon receipt of a signal indicating occurrence of a plurality of anomalies in a controller system of a production facility from the controller system, displaying, by an information processor communicable with the controller system, nature of the plurality of anomalies; after displaying the nature of the plurality of anomalies, accepting, by the information processor and for each anomaly, an input operation for assignment of a worker who is to handle the anomaly among a plurality of workers; upon receipt of the input operation and based on the assignment, notifying, by the information processor, a terminal device used by the worker of nature of the anomaly to be handled by the worker; upon acceptance of the nature of the anomaly from the information processor, displaying, by each of the plurality of terminal devices communicable with the information processor, contents of a remedy for the anomaly; upon acceptance of an input operation for inputting progress information indicating progress of the remedy, transmitting the progress information to the information processor by each terminal device; upon receipt of the progress information from the first terminal device, displaying the progress information by the information processor; after displaying the progress information, further accepting, by the information processor, an input operation for updating the assignment of a worker who is to handle each anomaly; and based on the assignment updated, notifying, by the information processor, the terminal device used by the worker of the nature of the anomaly to be handled by the worker.

The above method enables rapid recovery from each anomaly in the event of a plurality of anomalies.

Advantageous Effects of Invention

The above disclosure achieves the effect of recovering from each anomaly in the event of a plurality of anomalies.

BRIEF DESCRIPTION OF DRAWINGS

FIG. 8 shows another screen displayed by the terminal device of the work supervisor in another phase of step S1 of FIG. 5.

FIG. 9 shows a screen displayed by the terminal device of the work supervisor in one phase of step S2 of FIG. 5.

FIG. 10 shows an example screen displayed by the terminal device of the work supervisor after an input by the work supervisor to select items regarding No. 1 of a trouble list.

FIG. 11 shows a screen displayed by the terminal device of the work supervisor after calculation of an estimated work time.

FIG. 17 shows a screen displayed by the terminal device of the work supervisor who has accepted a report about the progress of work from the terminal device of the worker.

FIG. 19 shows a screen displayed by the terminal device of the worker.

FIG. 21 shows a screen displayed by the terminal device of the work supervisor.

FIG. 29 shows an example remedy manual.

FIG. 30 shows example ideal work time data.

FIG. 31 shows example profile data.

FIG. 32 shows example remedy history data.

DESCRIPTION OF EMBODIMENTS

Figure 1:
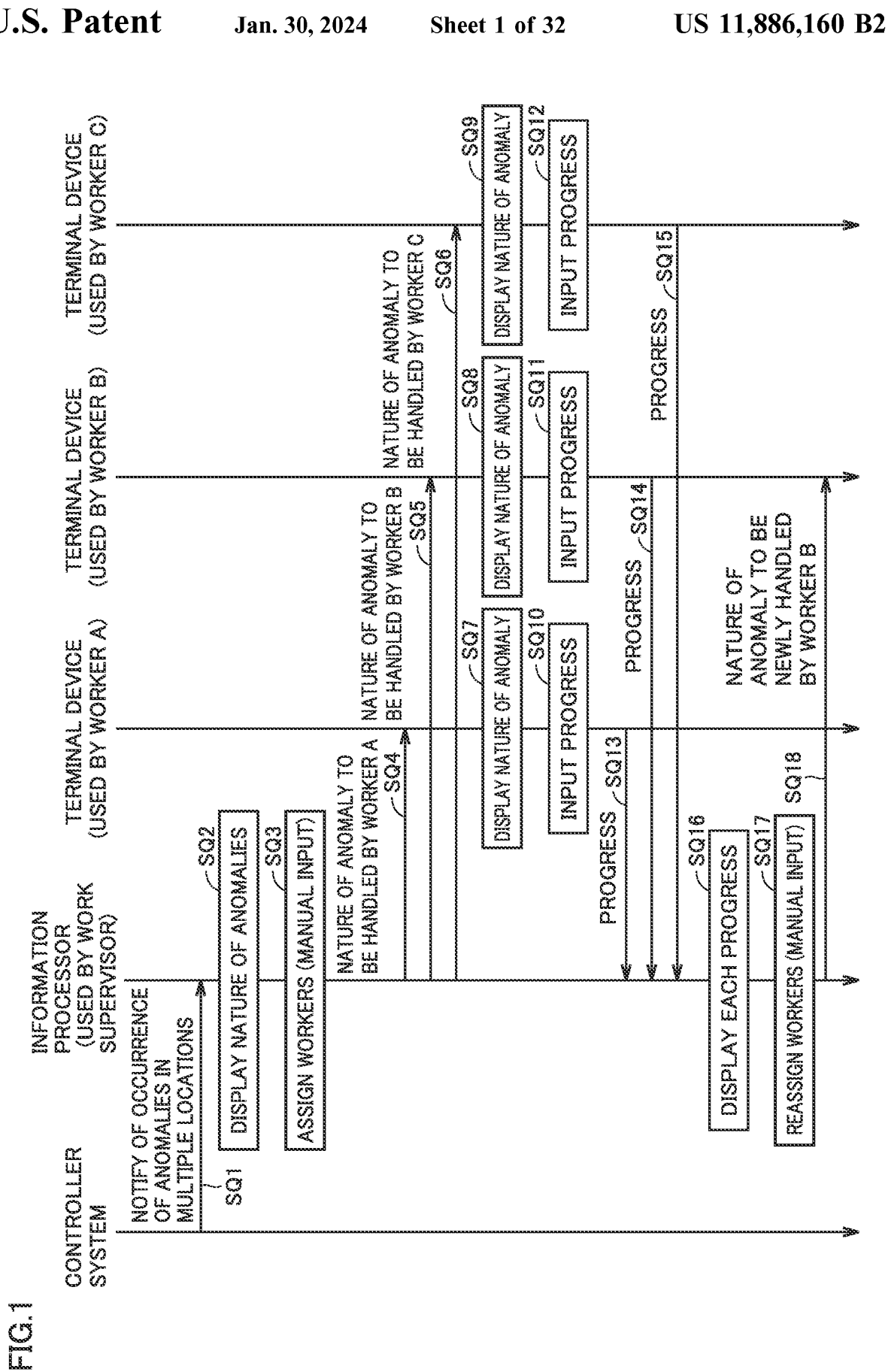
FIG. 1 is a sequence diagram for illustrating an outline of processing performed in a work support system.

The embodiments will now be described with reference to the drawings. The same or corresponding parts in the drawings have the same reference characters allotted. Their names and functions are also the same. Thus, detailed description thereof will not be repeated.

§ 1 Application Example

FIG. 1 is a sequence diagram for illustrating an outline of processing performed by a work support system.

Referring to FIG. 1, the work support system includes a controller system of a production facility, an information processor, and a plurality of terminal devices (first terminal devices). Although FIG. 1 shows three terminal devices, the number of terminal devices is not limited thereto. Typically, as many terminal devices as workers (persons in charge of recovery work) are used in the work support system.

The information processor is used, in the event of an anomaly in the controller system, by a work supervisor who supervises work (recovery work) for handling the anomaly. The information processor may be configured as a single item or composed of a plurality devices (e.g., a server and a terminal device) communicably connected to each other. The "work to handle an anomaly" includes the work to specify the cause of an anomaly and the work to recover from the anomaly.

Each of the plurality of terminal devices is used by the worker. The terminal device is a portable device. The worker heads for a location (scene) of occurrence of an anomaly while carrying a terminal device.

In a sequence SQ1, the controller system notifies the information processor of information (signal) indicating the occurrence of anomalies in a plurality of locations. This notification may be made such that the controller system voluntarily notifies the information processor, or the information processor inquires of the controller system to notify the information processor of the information. For example, in the latter case, the information processor can obtain the above information by periodically checking a status flag (a flag indicating either an normality or an anomaly) in the controller system.

In a sequence SQ2, the information processor displays the nature of the plurality of anomalies. In a sequence SQ3, the information processor accepts, for each anomaly, assignment input (manual input) of a worker from the work supervisor.

In a sequence SQ4, the information processor notifies a terminal device used by a worker A of the nature of an anomaly to be handled by worker A. In this case, in a sequence SQ7, the terminal device used by worker A displays the nature of the anomaly. Typically, the terminal device displays the contents of a remedy for the anomaly, automatically or based on an input operation by worker A.

In a sequence SQ5, the information processor notifies a terminal device used by a worker B of the nature of an anomaly to be handled by worker B. In this case, in a sequence SQ8, the terminal device used by worker B displays the nature of the anomaly. Typically, the terminal device displays the contents of a remedy for the anomaly, automatically or based on the input operation by worker B.

In a sequence SQ6, the information processor notifies a terminal device used by a worker C of the nature of an anomaly to be handled by worker C. In this case, in a sequence SQ9, the terminal device used by worker C displays the nature of the anomaly. Typically, the terminal device displays the contents of a remedy for the anomaly, automatically or based on an input operation by worker C.

In a sequence SQ10, worker A inputs progress to the terminal device. Upon input of the progress, in a sequence SQ13, the terminal device transmits data indicating the progress to the information processor.

In a sequence SQ11, worker B inputs progress to the terminal device. Upon input of the progress, in a sequence SQ14, the terminal device transmits data indicating the progress to the information processor.

In a sequence SQ12, worker C inputs progress to the terminal device. Upon input of the progress, in a sequence SQ15, the terminal device transmits data indicating the progress to the information processor.

In a sequence SQ16, the information processor displays progress of each work. In a sequence SQ17, the information processor accepts an assignment input (manual input) of a worker from the work supervisor for each anomaly. The work supervisor reassigns a worker in consideration of the progress of each work.

When the information processor has received the notification of the progress indicating the completion of the work from the terminal device of worker B, for example, the work supervisor performs an input for assigning worker B to another work. Upon receipt of this input, in a sequence SQ18, the information processor notifies the terminal device used by worker B of the nature of an anomaly to be newly handled by worker B. In this case, the terminal device used by worker B displays the nature of the anomaly.

BRIEF SUMMARY

As described above, the work support system includes a controller system of a production facility, an information processor communicable with the controller system, and a plurality of terminal devices, each of which is communicable with the information processor.

Upon receipt of a signal indicating the occurrence of a plurality of anomalies in the controller system from the controller system, the information processor displays the nature of the plurality of anomalies. After displaying the nature of the plurality of anomalies, the information processor accepts, for each anomaly, an input operation for assignment of a worker who is to handle an anomaly among a plurality of workers. Upon acceptance of the input operation, the information processor notifies (transmits), based on the assignment, the terminal device used by the worker of the nature of the anomaly to be handled by the worker.

Upon acceptance (receipt) of the nature of the anomaly from the information processor, each terminal device displays the contents of a remedy for the anomaly. Upon acceptance of the input operation for inputting progress information indicating the progress of the remedy, each terminal device transmits the progress information to the information processor.

Upon receipt of the progress information from the terminal device, the information processor displays the progress information. After displaying the progress information, the information processor further accepts an input operation for updating the assignment of a worker who is to handle each anomaly. The information processor notifies, based on the assignment updated, a terminal device used by the worker of the nature of an anomaly to be handled by the worker.

The above system configuration can change the assignment of workers based on the progress. In other words, the assignment of workers can be updated dynamically. The work support system can thus rapidly recover from each anomaly in the event of a plurality of anomalies.

§ 2 Example Configuration

<A. System Configuration>
(a1. Work Support System 1)
FIG. 2 is a schematic diagram showing a system configuration of a work support system 1 according to the present embodiment.

Figure 2:
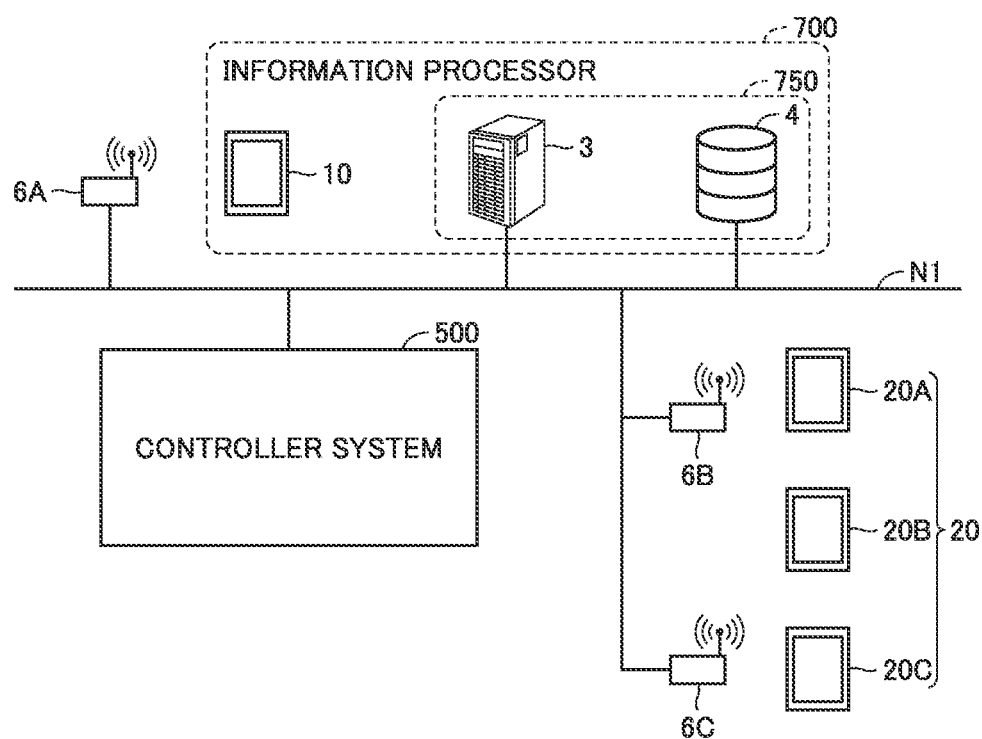
FIG. 2 is a schematic diagram showing a system configuration of the work support system.

Referring to FIG. 2, work support system 1 includes a controller system 500, an information processor 700, a plurality of terminal devices 20A, 20B, 20C, . . . , and a plurality of wireless routers 6A, 6B, 6C, . . . .

Hereinbelow, terminal devices 20A, 20B, 20C, . . . are merely referred to as "terminal devices 20" when they are not differentiated from each other. Also, wireless routers 6A, 6B, 6C, . . . are merely referred to as "wireless routers 6" when they are not differentiated from each other. The number of terminal devices 20 and the number of wireless routers 6 are not limited to the illustrated numbers.

Information processor 700 typically includes a terminal device 10 and a server 750. Server 750 typically includes a server 3 and a database server 4. Controller system 500, server 3, database server 4, and wireless routers 6 are communicably connected to each other via a network N1.

Terminal device 10 is used by the work supervisor. Each terminal device 20 is used by its corresponding worker. Terminal device 10 and terminal devices 20 are portable devices. Typically, terminal device 10 and terminal devices 20 are tablets.

In the example of FIG. 2, terminal device 10 is located so as to communicate with wireless router 6A. In other words, terminal device 10 is located so as to be served by the cell of wireless router 6A. Terminal devices 20A, 20B are located so as to communicate with wireless router 6B. Terminal device 20C is located so as to communicate with wireless router 6C.

Figure 3:
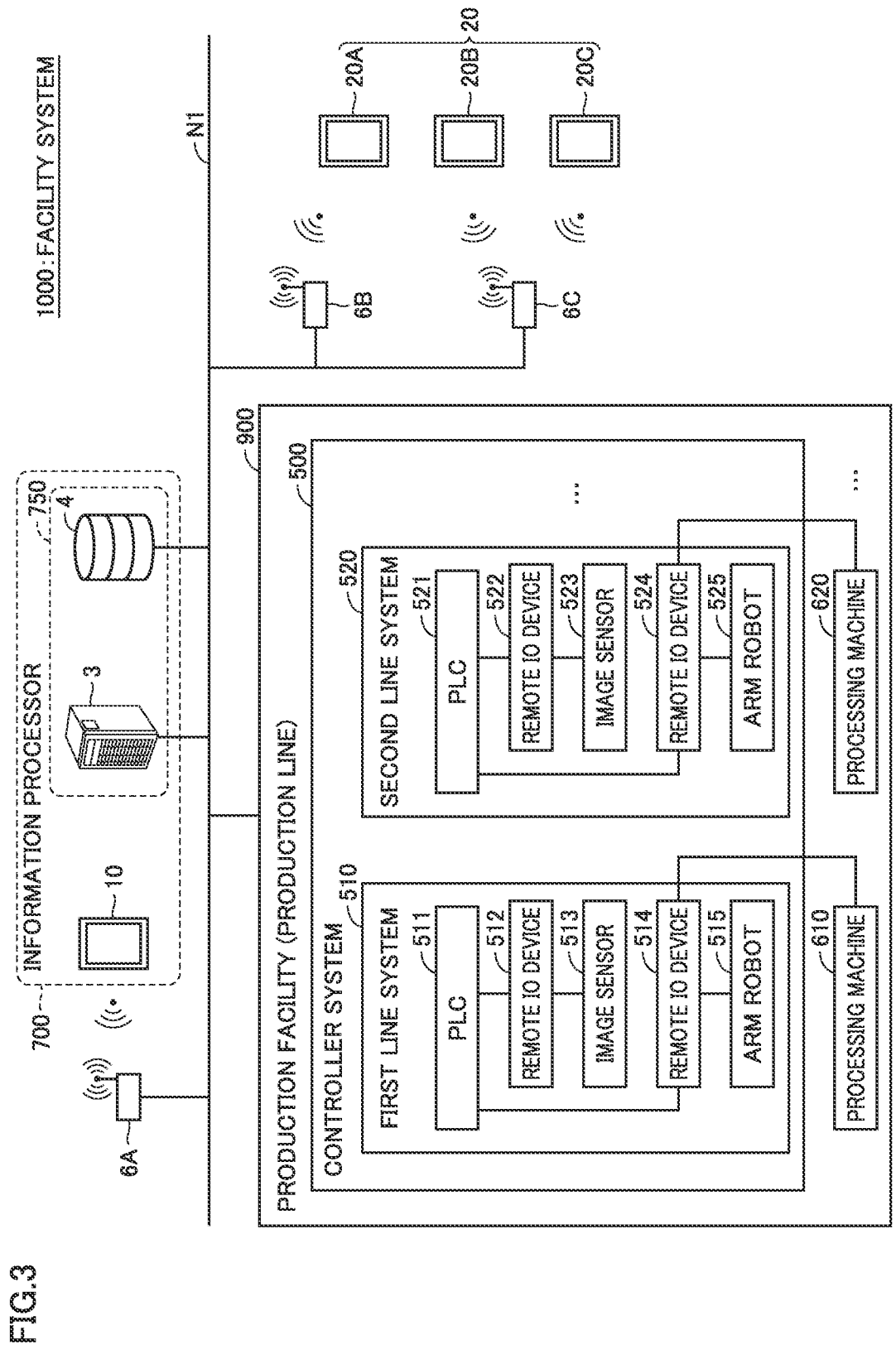
FIG. 3 is a schematic diagram for illustrating a facility system including a work support system 1 shown in FIG. 2.

(a2. Facility System 1000)
FIG. 3 is a schematic diagram for illustrating a facility system 1000 including work support system 1 shown in FIG. 2. Referring to FIG. 3, facility system 1000 includes a production facility (production line) 900, information processor 700, terminal devices 20, and wireless routers 6.

Production facility 900 includes controller system 500 and a plurality of processing machines 610, 620. Controller system 500 includes a plurality of line systems (first line system 510, second line system 520, . . . ).

First line system 510 includes a PLC (Programmable Logic Controller) 511, which is a controller, remote IO (Input Output) devices 512, 514, an image sensor 513, and an arm robot 515. PLC 511 is communicably connected to remote IO devices 512, 514. Image sensor 513 is connected to remote IO device 512. Arm robot 515 is connected to remote IO device 514.

Second line system 520 includes a PLC 521, which is a controller, remote IO devices 522, 524, an image sensor 523, and an arm robot 525. PLC 521 is communicably connected to remote IO devices 522, 524. Image sensor 523 is connected to remote IO device 522. Arm robot 525 is connected to remote IO device 524.

Facility system 1000 may include a MES (Manufacturing Execution System). The manufacturing execution system obtains information from a manufacturing device or facility to be controlled, and monitors and manages the overall production. The manufacturing execution system can deal with order information, quality information, shipping information, and any other information. Furthermore, a device that provides information service (processing of obtaining various pieces of information from a control target and performing macro-analysis or microanalysis) may be connected to network N1.

The configuration of production facility 900 and the configuration of controller system 500 shown in FIG. 3 are merely examples and are not limited to these configurations.

(a3. Production Facility 900)

Figure 4:
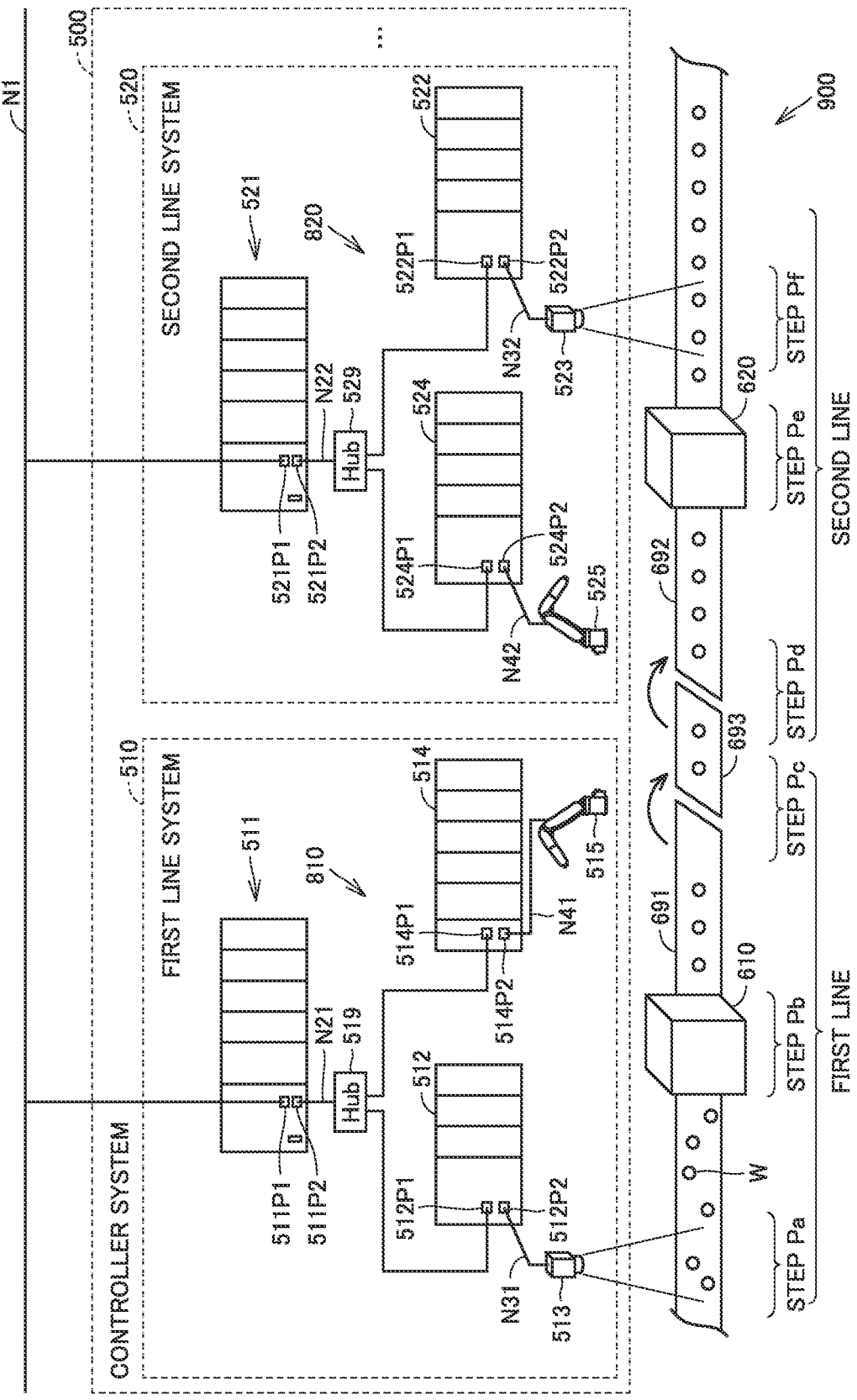
FIG. 4 is a schematic diagram showing a production facility in detail.

FIG. 4 is a schematic diagram showing production facility 900 in detail.

Referring to FIG. 4, production facility 900 includes controller system 500, processing machine 610, 620, conveyor belts 691, 692, and a mounting table 693 on which a workpiece W is temporarily mounted. Controller system 500 includes first line system 510 and second line system 520 as described above. In a first line, three steps Pa, Pb, Pc are performed. In a second line, three steps Pd, Pe, Pf are performed.

(1) First Line and First Line System

First line system 510 includes PLC 511 and a driving device 810. PLC 511 is connectable to a plurality of networks. In the example of FIG. 4, PLC 511 is connected to higher-level network N1 and a lower-level network N21.

Lower-level network N21 is connected with driving device 810. Driving device 810 is the collection devices for performing predetermined work on workpiece W directly or indirectly. In the example of FIG. 4, driving device 810 is composed of remote IO devices 512, 514, image sensor 513, and arm robot 515.

Remote IO device 512 has a plurality of physical communication ports. Different networks are connectable to different communication ports. In the example of FIG. 4, remote IO device 512 has two communication ports 512P1, 512P2. Network N21 is divided by a hub 519, where one divided portion is connected to communication port 512P1, and the other divided portion is connected to communication port 514P1. Communication port 512P2 is connected with a network N31. Network N31 is preferably a field network that performs fixed-cycle communications that guarantee a data arrival time. Known examples of the field network that performs such fixed-cycle communications include EtherCAT (registered trademark) and CompoNet (registered trademark).

Remote IO device 512 controls image sensor 513 in accordance with a control command of PLC 511. Image sensor 513 sequentially takes images of workpiece W transported on conveyor belt 691 in accordance with the control command received from remote IO device 512 and performs predetermined image processing on the obtained images (step Pa). Thus, image sensor 513 sequentially, for example, inspects the quality of workpiece W transported on conveyor belt 691. The inspection results of image sensor 513 are sequentially sent to PLC 511 via remote IO device 512.

Processing machine 610 performs predetermined machining (step Pb) on workpiece W on conveyor belt 691. For example, processing machine 610 performs cutting. Processing machine 610 is hard-wired (connected by wiring) to remote IO device 512. Processing machine 610 performs machining on workpiece W determined to have a good inspection result, and does not perform machining on a workpiece determined to have a poor inspection result.

Remote IO device 514 has a plurality of physical communication ports. Different communication ports are connectable with different networks. In the example of FIG. 4, remote IO device 514 has two communication ports 514P1, 514P2. Network N21 is divided by hub 519, where one divided portion is connected to communication port 514P1. Communication port 514P2 is connected with a network N41. Network N41 is preferably a field network that performs fixed-cycle communications that guarantee a data arrival time. Known examples of the field network that performs such fixed-cycle communications include EtherCAT and CompoNet.

Remote IO device 514 controls arm robot 515 in accordance with a control command of PLC 511. In one example, PLC 511 outputs, to remote IO device 514, a control command for causing arm robot 515 to perform predetermined work (step Pc) in accordance with the inspection step (step Pa) by image sensor 513. Remote IO device 514 controls arm robot 515 in accordance with the control command.

In one example, remote IO device 514 issues a control command so as to remove workpiece W determined to have a poor inspection quality from conveyor belt 691. Remote IO device 514 also issues a control command for moving workpiece W determined to have a good inspection quality to the second line. For example, remote IO device 514 moves workpiece W from conveyor belt 691 to mounting table 693. Note that the states (e.g., the position, angle, and the like of each joint) of arm robot 515 are sequentially fed back from remote IO device 514 to PLC 511.

(2) Second Line and Second Line System

Second line system 520 includes PLC 521 and a driving device 820. PLC 521 is connectable to a plurality of networks. In the example of FIG. 4, PLC 521 is connected to higher-level network N1 and a lower-level network N22.

Lower-level network N22 is connected with driving device 820. Driving device 820 is the collection of devices for performing predetermined work on workpiece W directly or indirectly. In the example of FIG. 4, driving device 820 is composed of remote IO devices 522, 524, image sensor 523, and arm robot 525.

Remote IO device 524 has a plurality of physical communication ports. Different communication ports are connectable with different networks. In the example of FIG. 4, remote IO device 524 has two communication ports 524P1, 524P2. Network N22 is divided by a hub 529, where one divided portion is connected to communication port 524P1. Communication port 524P2 is connected with a network N42. Network N42 is preferably a field network that performs fixed-cycle communications that guarantee a data arrival time.

Remote IO device 524 controls arm robot 525 in accordance with a control command of PLC 521. In one example, PLC 521 outputs, to remote IO device 524, a control command for causing arm robot 525 to perform predetermined work (step Pd). Remote IO device 524 controls arm robot 525 in accordance with the control command.

In one example, remote IO device 524 issues a control command so as to move workpiece W placed on mounting table 693 to second line. Specifically, remote IO device 524 moves workpiece W from mounting table 693 to conveyor belt 692. Note that the states (e.g., the position, angle, and the like of each joint) of arm robot 525 are sequentially fed back from remote IO device 524 to PLC 521.

Processing machine 620 performs predetermined machining (step Pe) on workpiece W on conveyor belt 692. For example, processing machine 620 performs cutting. Processing machine 620 is hard-wired (connected by wiring) to remote IO device 522.

Remote IO device 522 has a plurality of physical communication ports. Different communication ports are connectable with different networks. In the example of FIG. 4, remote IO device 522 has two communication ports 522P1, 522P2. Network N22 is divided by hub 529, where one divided portion is connected to communication port 524P1 and the other divided portion is connected to communication port 522P1. Communication port 522P2 is connected with a network N32. Network N32 is preferably a field network that performs fixed-cycle communications that guarantee a data arrival time.

Remote IO device 522 controls image sensor 523 in accordance with a control command of PLC 521. Image sensor 523 sequentially takes images of workpiece W transported on conveyor belt 692 in accordance with the control command received from remote IO device 522 and performs predetermined image processing on the obtained images (step Pf). Thus, image sensor 523 sequentially, for example, inspects the quality of workpiece W transported on conveyor belt 692. The inspection results of image sensor 523 are sequentially sent to PLC 521 via remote IO device 522.

The description on the other lines after the second line are omitted herein.

Cooperative processing in the event of a plurality of anomalies in controller system 500 will now be described. Note that similar cooperative processing can be performed also in the event of a plurality of anomalies in production facility 900 including processing machines 610, 620 in addition to controller system 500.

<B. Control Structure>

Figure 5:
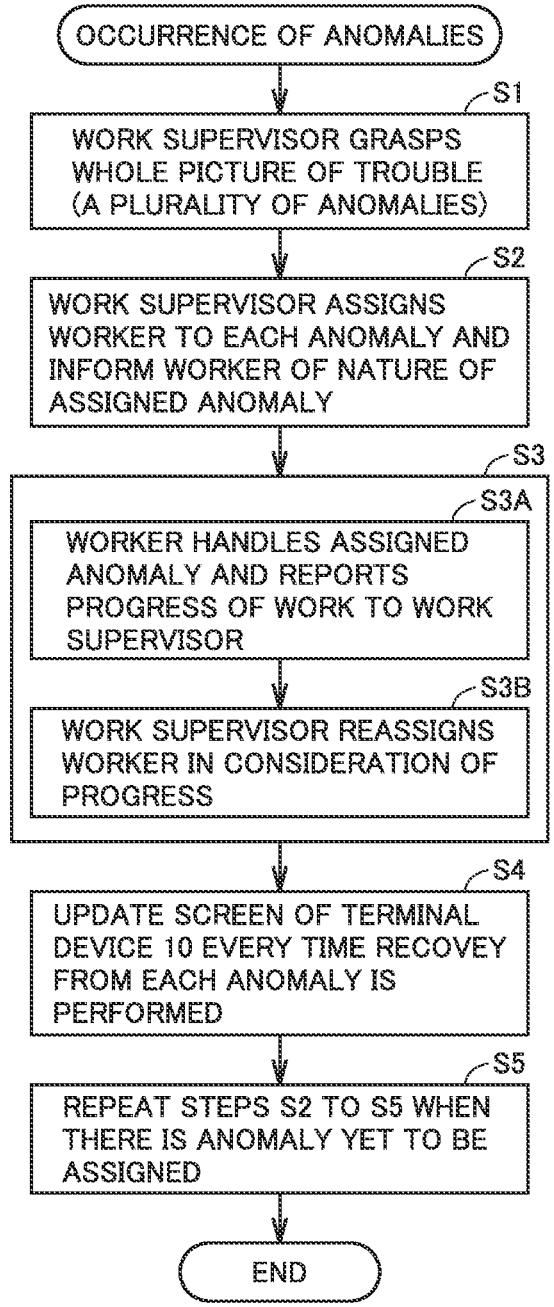
FIG. 5 is a flowchart showing an outline of a processing flow in the work support system.

FIG. 5 is a flow diagram showing an outline of a processing flow in work support system 1. Note that a subject of processing will be referred to as a person or device below for convenience of description.

Prior to step S1 described below, a map (layout diagram), which serves as a guide for travel of a worker in a factory where production facility 900 (see FIG. 4) is installed, and profile data, which shows profiles of workers, need to be created. Since the map is created using an existing device (e.g., self-propelled mobile robot) and existing software, the map is not described here in detail.

Referring to FIG. 5, at step S1, the work supervisor grasps the whole picture of trouble (a plurality of anomalies) using terminal device 10. At step S2, the work supervisor assigns a worker to each anomaly, and informs the worker of the nature of the assigned anomaly.

At step S3A of step S3, the worker handles (addresses) the assigned anomaly and reports the progress of the work to the work supervisor using his/her terminal device 20. At step S3B, the work supervisor reassigns a worker in consideration of the progress of each worker.

At step S4, terminal device 10 updates a display screen every time recovery from each anomaly is performed. At step S5, steps S2 to S5 are repeated when there is an anomaly yet to be assigned with a worker.

Figure 6:
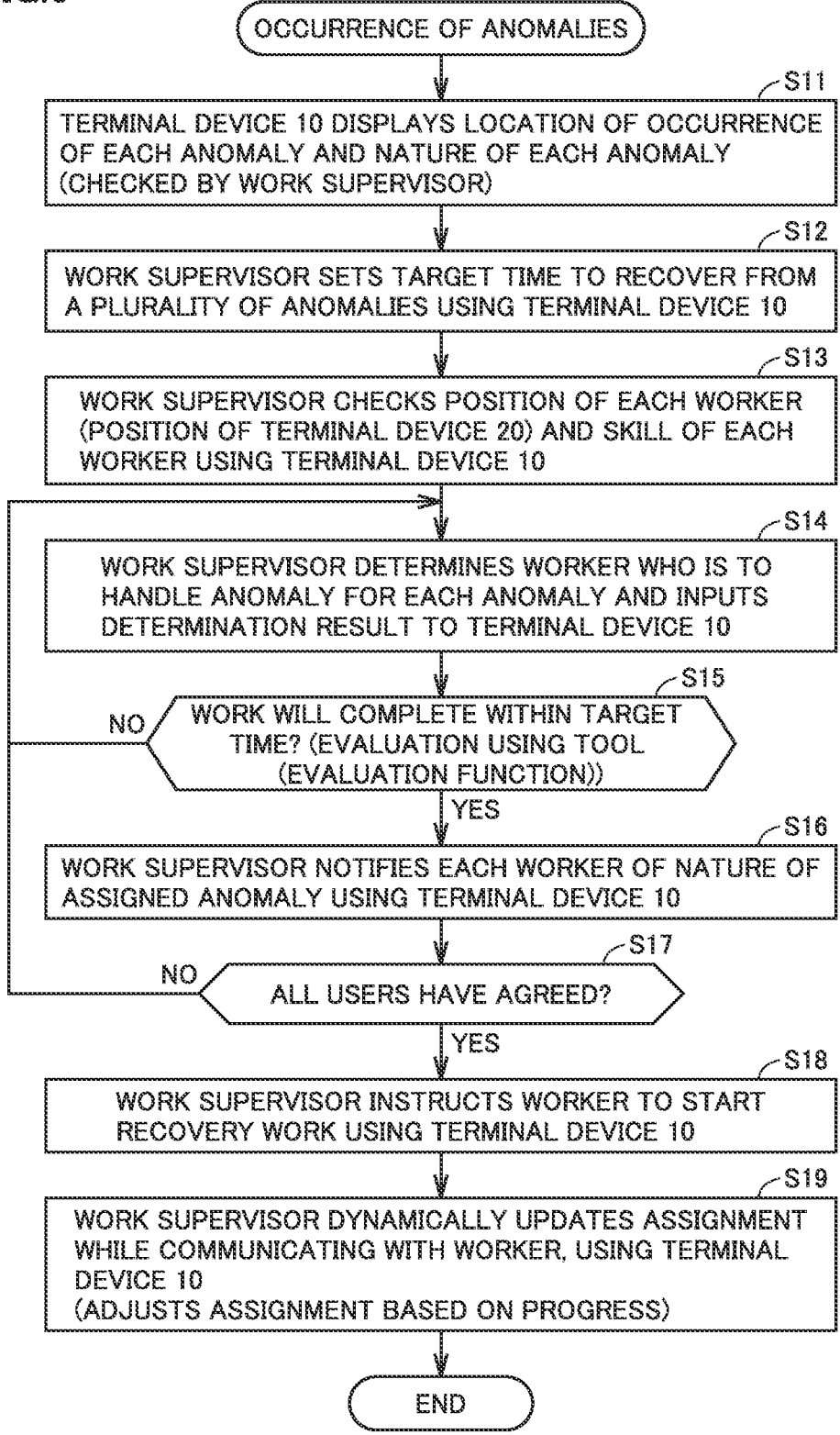
FIG. 6 is a flowchart showing details of a processing flow in the work support system.

FIG. 6 is a flow diagram showing details of a processing flow in work support system 1. Note that a subject of processing will be referred to as a person or device below for convenience of description.

Referring to FIG. 6, at step S11, terminal device 10 displays the location of occurrence of each anomaly and the nature of each anomaly. This allows the work supervisor, who is the user of terminal device 10, to check such information.

At step S12, the work supervisor sets a target time (hereinbelow, also referred to as "target completion time") for recovering from a plurality of anomalies using terminal device 10. In other words, the target completion time is a target time for completing the remedies for all anomalies. The target completion time is notified to the server 3.

At step S13, the work supervisor checks the position of each worker and the skill of each worker using terminal device 10. GPS location information of terminal device 20 is used for the position of each worker. The information on the skill of each worker is stored in database server 4, and terminal device 10 obtains the information from database server 4.

At step S14, the work supervisor determines a worker who is to handle an anomaly for each anomaly and inputs the determination result to terminal device 10. The input determination result is notified to server 3.

At step S15, server 3 determines whether or not the work will complete within the target completion time. Specifically, server 3 performs evaluations using a tool (typically, an evaluation function) to determine whether or not the work will complete within the target completion time.

When it is determined that the work will complete within the target completion time (YES at step S15), at step S16, the work supervisor notifies each worker of the nature of the assigned anomaly using terminal device 10. Specifically, the work supervisor individually notifies the worker of a command to "handle an assigned anomaly and recover from the anomaly" using terminal devices 10, 20. When it is determined that the work will not complete within the target completion time (NO at step S15), the process returns to step S14, and the work supervisor performs step S14 again.

At step S17, it is checked whether or not notifications indicating that assigned anomalies can be addressed (acceptance notifications) are received from all workers (specifically, workers to be assigned with anomalies).

When acceptance notifications are obtained from all workers (YES at step S17), at step S18, the work supervisor instructs the worker to start recovery work, using terminal device 10. In contrast, when acceptance notifications are not obtained from all workers (NO at step S17), the process returns to step S14, and the work supervisor performs step S14 again. The work supervisor instructs to start recovery work on condition that agreement has been obtained from all workers, as described above.

At step S19, the work supervisor dynamically updates assignment while communicating with the workers, using terminal device 10. In other words, the work supervisor appropriately adjusts the assignment of a worker to each anomaly in consideration of the progress of the work of each worker.

<C. Details of Steps S1 to S5>

Details of processing of steps S1 to S4 shown in FIG. 5 will now be described using example user interfaces (example screens) displayed in terminal device 10 and terminal device 20.

Note that terminal device 10 and terminal device 20 communicate with server 3 to display various screens, which will be described below. Typically, terminal device 10 and terminal device 20 each have a Web browser and displays these screens as the Web page is downloaded from server 3.

(c1. Step S1)

Figure 7:
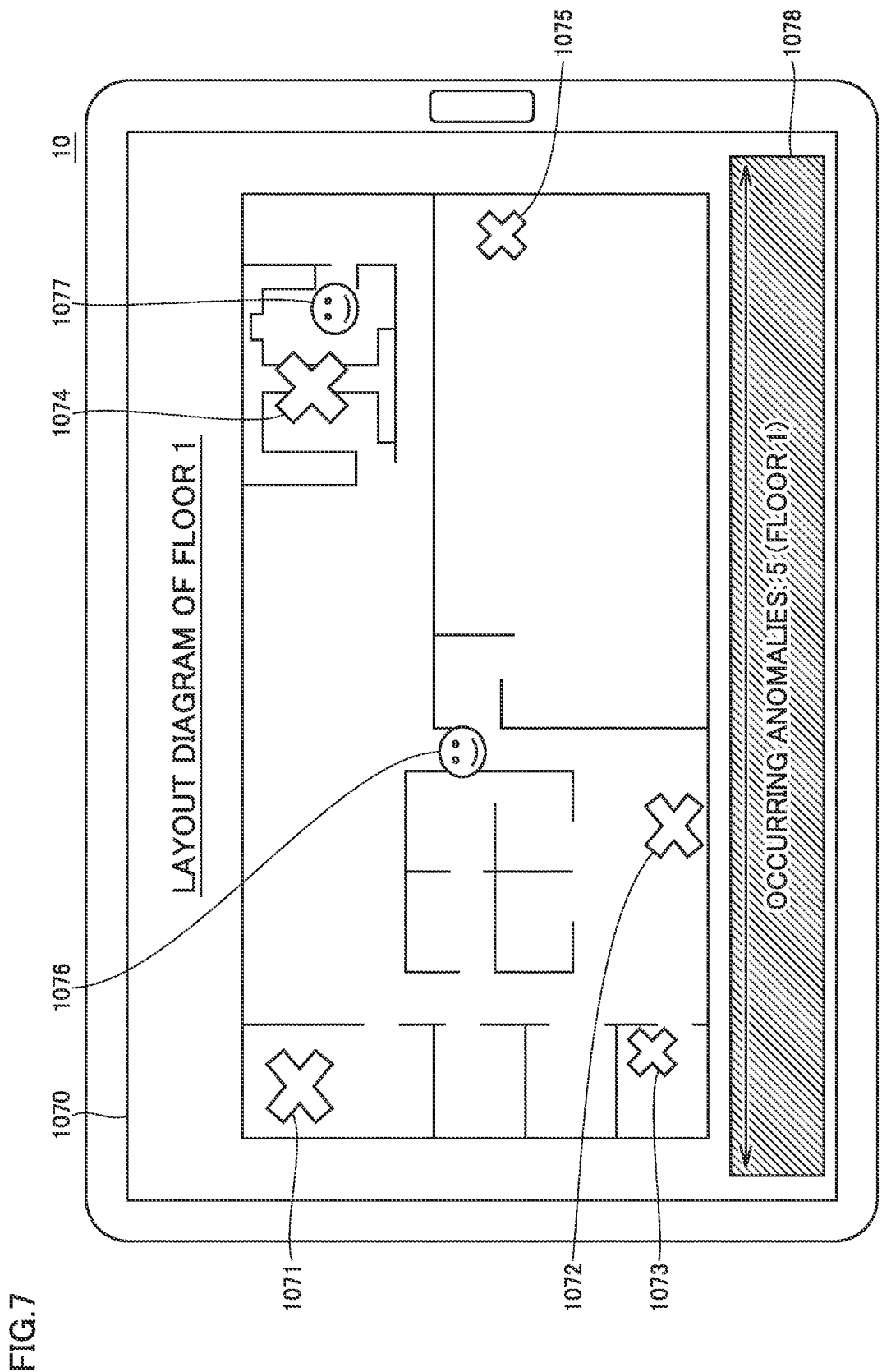
FIG. 7 shows a screen displayed by a terminal device of a work supervisor in one phase of step S1 of FIG. 5.

FIG. 7 shows a screen 1070 displayed by terminal device 10 in one phase of step S1 of FIG. 5.

Referring to FIG. 7, when server 3 receives a signal indicating the occurrence of a plurality of anomalies in controller system 500 from controller system 500, terminal device 10 communicates with server 3 to display the nature of the plurality of anomalies.

Typically, terminal device 10 displays at least icons 1071, 1072, 1073, 1074, indicating the locations of occurrence of the plurality of anomalies, an object image 1078, indicating the number of anomalies, and icons 1076, 1077, indicating the current positions of the workers on the display of terminal device 10 while superimposing these icons and the object image on the floor map. For example, when the plurality of anomalies occur over a plurality of floors and cannot be displayed at a time, terminal device 10 displays, for example, the locations of occurrence of the anomalies, the number of the anomalies, and the current positions of the workers for reach floor.

For example, as the degree of emergency of an anomaly is higher, the sizes of icons 1071, 1072, 1073, 1074 (x marks in this example) indicating the locations of occurrence of anomalies may be displayed larger. The degree of emergency is pre-registered in server 3.

Server 3 determines the location of occurrence of an anomaly using wiring information of production facility 900 (in particular, controller system 500). The wiring information includes information for identifying wires that connect the respective devices and the positions of the wires. The wiring information is preliminarily created and stored in server 3, similarly to the map (layout diagram).

As terminal device 10 displays screen 1070 as described above, the work supervisor can immediately learn the whole picture of the anomalies that have occurred.

FIG. 8 shows another screen 1080 displayed by terminal device 10 in another phase of step S1 of FIG. 5.

Referring to FIG. 8, for example, when the work supervisor performs a predetermined input with screen 1070 of FIG. 7 displayed in terminal device 10, terminal device 10 switches the screen displayed on the display from screen 1070 to screen 1080. Screen 1080 includes a trouble list 1081 and an object image 1082 for explaining color coding of the list.

Trouble list 1081 has a column for identification numbers (Nos.), a column for dates and times of occurrence of anomalies, a column for nature of anomalies (nature of trouble), a column for degrees of emergency of anomalies, a column for remedy methods, a column for the presence or absence of repeat, a column for statuses, a column for worker assignment, a column for ideal work times, and a column for estimated work times. The ideal work time and estimated work time will be described below.

Color coding is made in accordance with statuses in trouble list 1081. Such color coding allows the work supervisor to immediately distinguish among an anomaly yet to be subjected to recovery work by a worker, an anomaly being subjected to recovery work, and an anomaly after the completion of recovery work.

(c2. Step S2)

The work supervisor inputs a target completion time using terminal device 10. The target completion time is a target time in which remedies for all anomalies complete as described above. Terminal device 10 transmits the input target completion time to server 3.

Server 3 calculates a time (ideal work time) required for the work to recover from an anomaly by anomaly based on a target completion time and a past work history (a record of a time required for the work). Server 3 updates a Web page after calculating each ideal work time. The Web page includes information on each ideal work time.

FIG. 9 shows a screen 1090 displayed by terminal device 10 in one phase of step S2 of FIG. 5. Referring to FIG. 9, screen 1090 is an example screen displayed when server 3 displays a Web page including information on each ideal work time. Screen 1090 includes a trouble list 1091.

Information on the ideal work times calculated by server 3 is displayed in the column for ideal work times in trouble list 1091. Trouble list 1091 is a list after the update of trouble list 1081 (see FIG. 8) and is different from trouble list 1081 only in the description of the column for ideal work times.

FIG. 10 shows an example of a screen 1100 displayed in terminal device 10 after input by the work supervisor to select items regarding No. 1 (anomaly No. 1) of trouble list 1091.

Referring to FIG. 10, screen 1100 includes nature of an anomaly (trouble) that has occurred, detailed information 1102 on the anomaly, and a worker list 1103.

Detailed information 1102 includes a degree of emergency, a remedy method, an expected time required to a solution (minute/person), required skills, a name of a person in charge of configuration setting and wiring, and repeat (whether or not the same trouble occurred before).

Worker list 1103 shows profiles of workers. Worker list 1103 includes at least a column for worker names, a column for skills possessed, and a column for past careers. A worker relevant to the selected anomaly is preferentially displayed in worker list 1103.

A Web page for displaying screen 1100 is also created by server 3. The contents of screen 1100 may be included in screen 1090.

A technique of assigning workers will now be described. The work supervisor assigns a worker who is to handle each anomaly with reference to trouble list 1091 and the displayed contents of screen 1100. Server 3 makes evaluations after the assignment. A tool (specifically, evaluation function) is used to evaluate whether or not assignment is proper or not. Evaluation is made in consideration of the recovery times of all anomalies. The evaluation contents are displayed in terminal device 10.

When the evaluation is low, the work supervisor performs reassignment. Subsequently, reevaluation is made, and when there is no problem, terminal device 20 of the worker is notified of the nature of an anomaly to be handled. Subsequently, the worker starts recovery work.

Evaluation will now be described with a specific example. The evaluation function is defined as Equation (1) below.

$$\text{Evaluation function}=\text{target completion time}-\text{total estimated work time} \quad (1)$$

The target completion time is a target time in which the remedies for all anomalies complete as described above, and is input (set) by the work supervisor. The total estimated work time is a time obtained by adding up estimated times required for addressing individual anomalies (estimated work times) for all anomalies. Specifically, the estimated work time is defined as Equation (2) below.

$$\text{Estimated work time}=\text{travel time}+\text{work time of worker} \quad (2)$$

The travel time is a time required for a worker to travel from the current position of the worker to a location of an occurring anomaly. Server 3 calculates the travel time based on information on the current position of the worker.

In contrast, the work time of the worker is determined by server 3 referring to the profile data stored in database server 4. When one worker handles one anomaly, a work time for the anomaly in the profile data of the worker is a work time of a worker. When a plurality of workers handle one anomaly, server 3 calculates a work time of a worker based on the work time for the anomaly in the profile data of each worker and the number of workers who handle the anomalies.

For example, assume that a work time in the case where worker B or worker D alone handles anomaly No. 1 shown in trouble list 1091 is registered as "20 minutes" in database server 4. In this case, when the work supervisor assigns worker B and worker D to anomaly No. 1, server 3 performs a predetermined computation and calculates the work time, for example, "15 minutes".

Note that the ideal work time for anomaly No. 1 is 10 minutes, as shown in screen 1090 (FIG. 9). Thus, 15 minutes described above is too long as the work time (estimated work time) for one anomaly, resulting in a lower overall evaluation.

Server 3 calculates an estimated work time for each anomaly using Equation (2) described above, and then obtains the sum of the estimated work times. In other words, server 3 calculates a total estimated work time for all anomalies. Further, server 3 substitutes the calculated total estimated work time in Equation (1) described above, thereby calculating a value of the evaluation function. Server 3 provides a higher evaluation as the value of the evaluation function is smaller (as smaller in positive value). In other words, server 3 provides a higher evaluation as the total estimated work time is closer to the target completion time.

When the evaluation function assumes a minus value, since the work will not complete within the target completion time, server 3 notifies terminal device 10 that the work will not complete within the target completion time. Note that server 3 provides a lower evaluation in this case.

In the case of a lower evaluation, the work supervisor reviews the assignment of workers. Server 3 makes an evaluation again based on the reviewed assignment. A series of such processing is repeated until a high evaluation (evaluation of not less than a certain level) is obtained. When a high evaluation is not obtained even after evaluations are repeatedly made, server 3 may notify the work supervisor of the review of a target completion time.

The mechanism for considering a degree of contribution to fostering of younger workers may be incorporated into work support system 1.

FIG. 11 shows a screen 1100 displayed by terminal device 10 after the calculation of the estimated work time. Referring to FIG. 11, screen 1110 is an example screen displayed when server 3 displays a Web page including information on each estimated work time. Screen 1110 includes a trouble list 1111.

The information on the estimated work time calculated by server 3 is displayed in the column for estimated work times in trouble list 1111. Trouble list 1111 is a list after the update of trouble list 1091 (see FIG. 9) and is different from trouble list 1091 only in the description of the column for estimated work times.

After the evaluation, the worker who has received an assignment command from the work supervisor determines for oneself whether or not the worker can handle the assigned anomaly (specifically, a remedy for the anomaly). When determining to be able to handle the anomaly, the worker notifies the work supervisor (specifically, terminal device 10) that the worker will take charge of the work to recover from an anomaly, using terminal device 20. When determining to be unable to handle the anomaly, the worker notifies the work supervisor that the worker will not take charge of the recovery work using terminal device 20. The worker determines whether or not he/she can handle the anomaly in consideration of his/her skill, experience, or the like.

The notification to the work supervisor can be made based on the selection of yes/no buttons displayed on the screen of terminal device 20. Alternatively, a notification may be made through an input to a message input field set on the screen of terminal device 20.

BRIEF SUMMARY (1) Terminal device 10 displays information for supporting assignment of workers (hereinafter also referred to as "support information"), as described above. This support information includes location information of each worker, skill information indicating the skills of each worker, experience information indicating work experience of each worker, occurrence location information indicating a location in which each abnormal has occurred, and a degree of emergency of each anomaly. The support information preferably includes an ideal number of workers who handle each anomaly.

The work supervisor assigns workers while checking work support information. For example, the work supervisor assigns workers based on the skills and the work experience (typically, maintenance experience). For example, the work supervisor assigns a worker who has carried out maintenance of the PLC as a worker who will take of an anomaly on the PLC side. Also, the work supervisor assigns the worker who has set the image sensor and performed wiring as a worker who will take charge of an anomaly of the image sensor. The work supervisor assigns workers based on the system wiring information and worker location information.

An appropriate assignment is enabled by the work supervisor performing an assignment with reference to such support information.

(2) Terminal device 10 further accepts an input operation for setting a target completion time to recover from a plurality of anomalies that have occurred in controller system 500.

Server 750 (see FIG. 3) including server 3 and database server 4 stores support information, and information indicating an ideal work time to recover from an anomaly for each anomaly (hereinafter, also referred to as "ideal time information"). Based on the ideal time information, server 750 determines whether or not the work to recover from a plurality of anomalies that have occurred in controller system 500 will complete within the target completion time set by terminal device 10. Terminal device 10 displays the result of the determination by server 750.

Thus, the work supervisor who is the user of terminal device 10 can learn in advance whether or not the work to recover from a plurality of anomalies will complete within the target completion time set by terminal device 10.

(3) When it is determined that the work to recover from a plurality of anomalies will not complete within the target completion time, terminal device 10 further accepts an input operation for changing assignment of workers.

The work supervisor can thus attempt to make an assignment again so as to complete the recovery work within the target completion time.

(4) Based on the information indicating a time required for each worker to arrive at the location at which an anomaly has occurred (hereinbelow, also referred to as "required time information") and the ideal time information, server 750 determines whether or not the work to recover from a plurality of anomalies that have occurred in controller system 500 will complete within the target completion time.

With the above configuration, the work supervisor can learn whether or not the work to recover from a plurality of anomalies will complete within the target completion time set in terminal device 10 by causing terminal device 10 to display the determination result of server 750.

(5) Upon acceptance of the nature of the anomaly from information processor 700 (specifically, terminal device 10), terminal device 20 provides a display for inquiring of the worker whether or not the worker can handle the anomaly. Upon input of a response to the inquiry, terminal device 20 transmits the response to information processor 700 (specifically, terminal device 10). Information processor 700 (specifically, terminal device 10) displays the response.

Such a configuration allows the work supervisor to perform assignment work reflecting the worker's intent.

Variations

Typically, evaluations are made in server 3. However, the present disclosure is not limited thereto, and work support system 1 may be configured such that terminal device 10 makes evaluations.

When assigning workers, the work supervisor preferably assigns workers to the respective segments (in the example of FIG. 4, first line system, second line system, . . . ) and instructs the workers to communicate with each other in order to identify the cause of occurrence of an anomaly.

Terminal device 20 preferably displays an ideal work time to recover from an anomaly to be handled by a worker who uses terminal device 20. Such display allows the worker to have a target for the work completion time.

For example, work support system 1 may be configured to allow server 3 to assign workers in consideration of the worker's attendance data, which is stored in database server 4.

(c3. Step S3)

Figure 12:
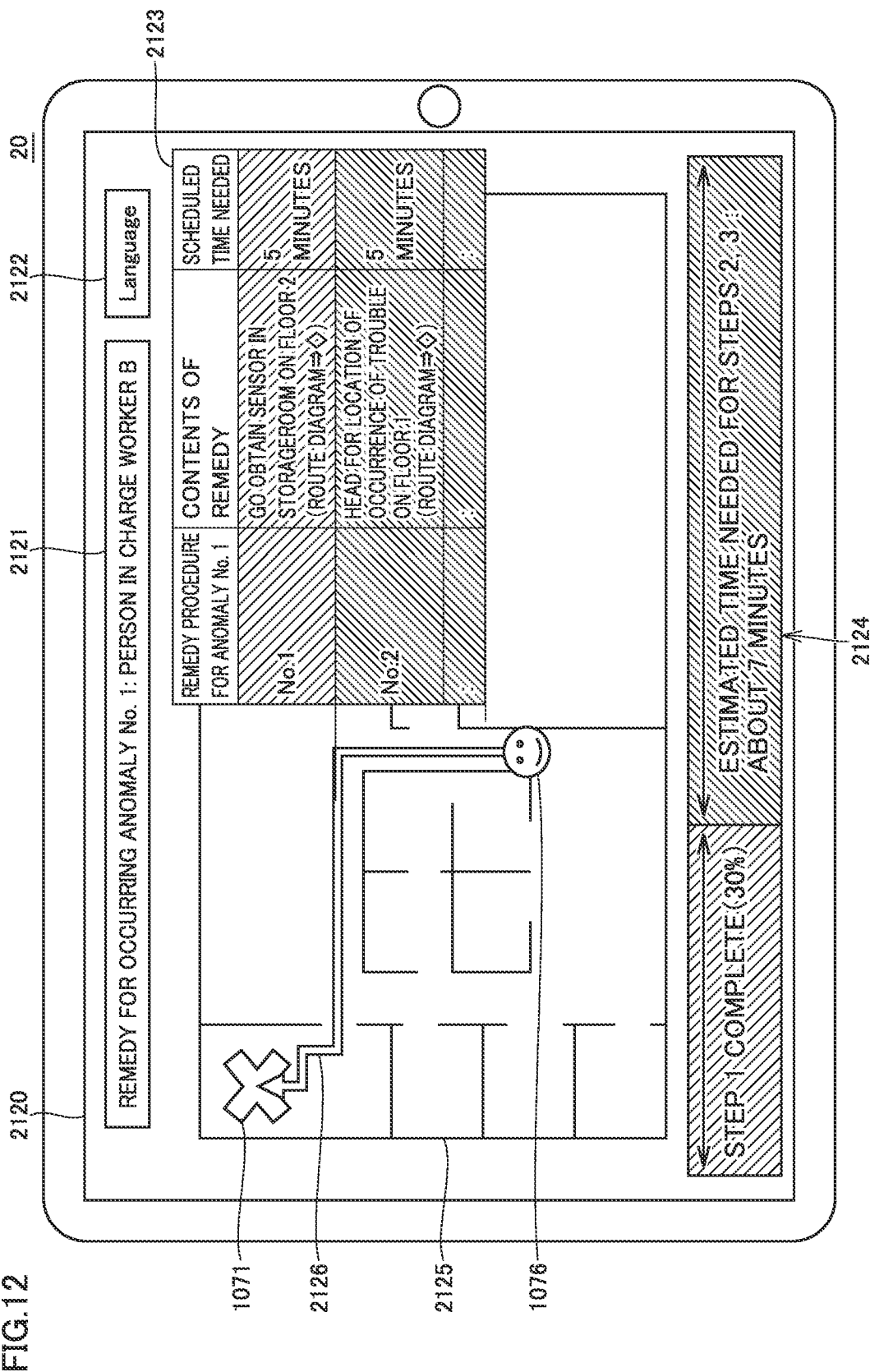
FIG. 12 shows a screen displayed by the terminal device of the worker in one phase of step S3 of FIG. 5.

FIG. 12 shows a screen 2120 displayed by terminal device 20 in one phase of step S3 of FIG. 5. Screen 2120 is an example screen displayed in terminal device 20 of the worker assigned with recovery work No. 1.

Referring to FIG. 12, screen 2120 includes object images 2121, 2122, 2124, a list 2123, and a floor map 2125. Object images 2121, 2122, 2124 and list 2123 are displayed while being superimposed on floor map 2125.

Object image 2121 shows an identification number of an anomaly to be handled by a worker and the name of the worker will take charge of this work. Object image 2122 is provided for selecting a language displayed on the screen. As the worker selects object image 2122, choices of a plurality of languages are displayed. Selection of a desired language by the worker causes a transition to the screen display in the selected language. Thus, even workers who use different languages can perform the recovery work using terminal device 20.

List 2123 includes a column for processing steps for addressing assigned anomalies, a column for specific contents of remedies, and a column for scheduled times needed. When parts need to be replaced or an examination device is required, it is necessary to go to the storage location to obtain such parts and such a device. Thus, the column for processing steps includes such activities of the workers. The scheduled time needed is a time required for each activity. For the travel of the worker, for example, a scheduled time needed is calculated by server 3 based on the worker location information and the storage location of parts or the anomaly occurrence location, and the scheduled time needed is displayed in terminal device 20 as illustrated.

The storage location of parts, a work procedure, and the like are shown in the column for contents of remedies. The work procedure is pre-stored in server 3. Terminal device 20 accesses server 3 to download the Web page of the work procedure. This causes terminal device 20 to display the work procedure. The worker can thus easily learn by what procedure the process should be advanced.

The remedy procedure, the remedy of which is complete, and the remedy procedure, the remedy of which is yet to be complete, are displayed differently in list 2123. For example, the remedy procedure, the remedy of which is complete, is coded with a color different from that of the remedy procedure, the remedy of which is yet to be complete. This allows the worker to grasp a remedy procedure to be performed next, immediately and without fail.

An icon 1071, indicating the location of occurrence of the anomaly, an icon 1076, indicating the current position of the worker, and an object image 2126, indicating the route from the current position to the location of occurrence of the anomaly, are displayed on floor map 2125. Such display of floor map 2125 allows the worker to immediately travel to the location of occurrence of the anomaly.

Object image 2124 shows progress for one anomaly assigned to the worker. The progress is typically displayed by being segmented for each remedy procedure. A ratio of a complete remedy to all remedy procedures and a time required for processing incomplete remedies are displayed in object image 2124.

Such display of object image 2124 allows the worker to immediately grasp the progress of the recovery work that he/she is in charge of.

Figure 13:
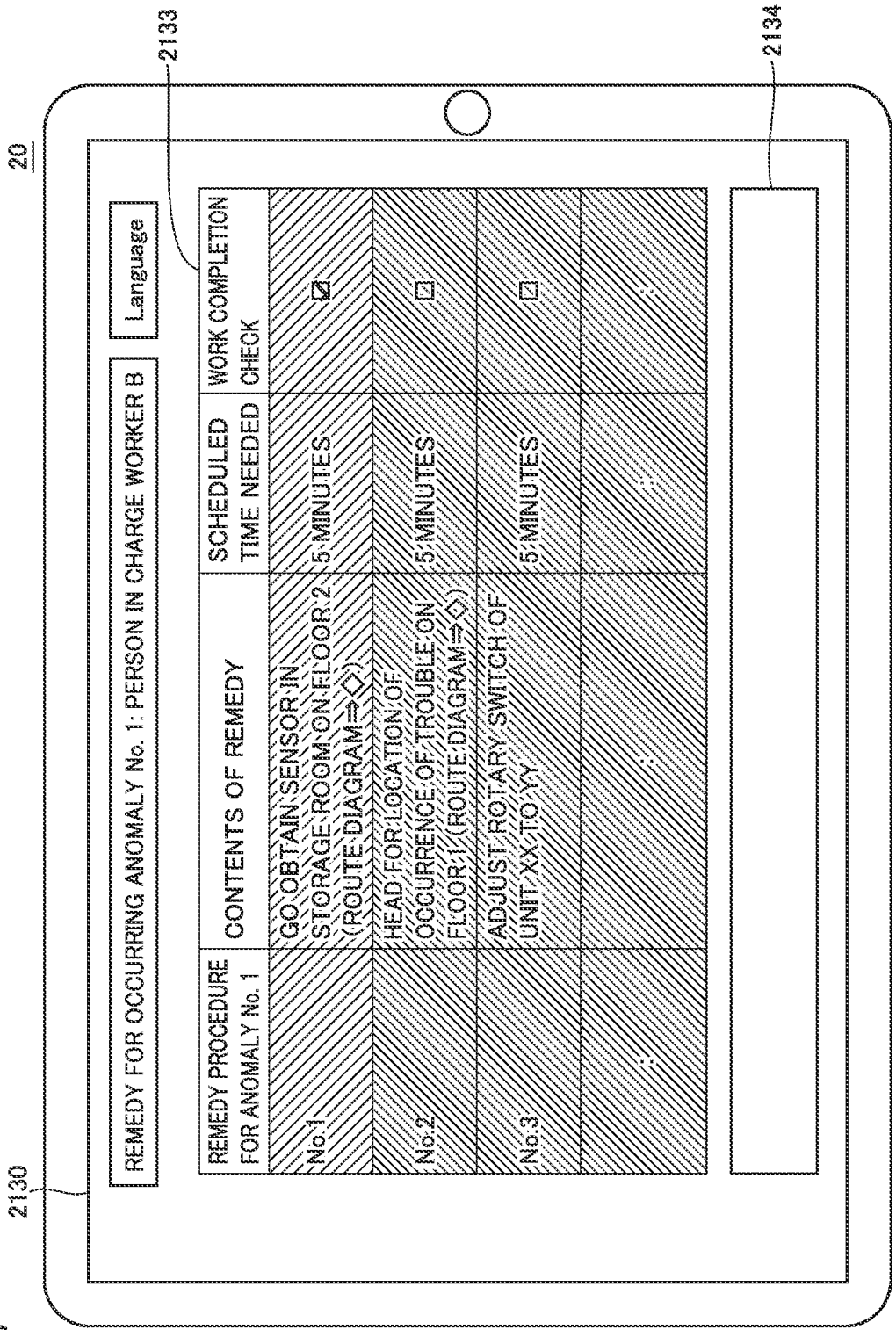
FIG. 13 shows a screen displayed by the terminal device of the worker.

FIG. 13 shows a screen 2130 displayed by terminal device 20. Screen 2130 is displayed as the worker performs a predetermined input with screen 2120 as shown in FIG. 12 displayed.

Referring to FIG. 13, screen 2130 includes a list 2133 and a message I/O field 2134. List 2133 is different from list 2123 of FIG. 12 in that list 2133 further includes a work completion check column.

Upon completion of the remedy procedure, the worker checks a corresponding checkbox. After the check, terminal device 20 transmits identification information of the checked remedy procedure to server 3. Upon receipt of the identification information, server 3 creates a Web page for updating the progress and updates the display of terminal device 10. In other words, progress is automatically notified to the work supervisor through checking by the worker. Checking of the checkbox serves as evidence of the completion of work.

Message I/O field 2134 is used for communications with the work supervisor. In message I/O field 2134, for example, a text is displayed in an interactive manner. If the worker is confused about the remedy, for example, the worker can transmit a message to the work supervisor to receive advice from the work supervisor. Such a message I/O field can make recovery work more efficient.

Figure 14:
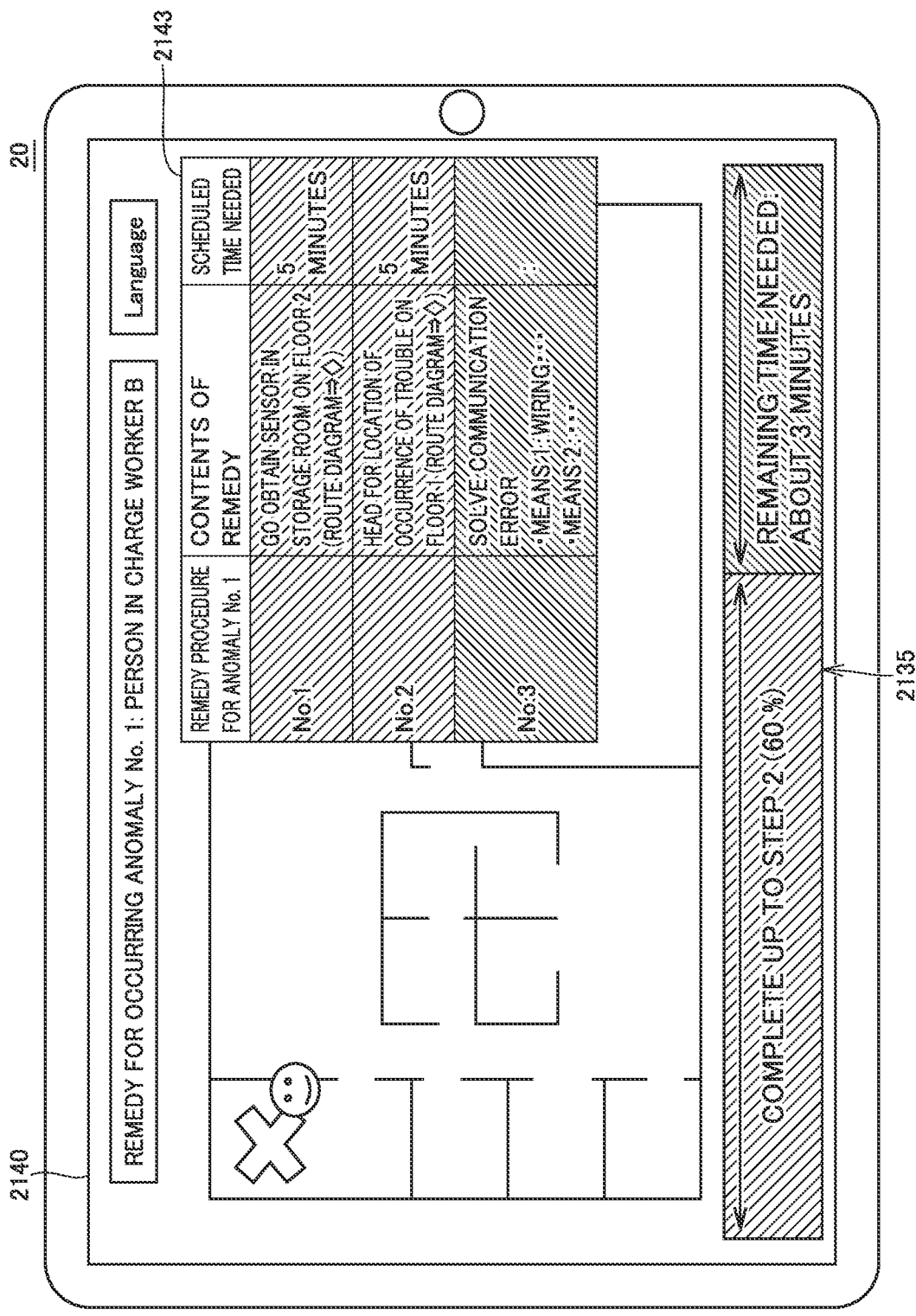
FIG. 14 shows a screen displayed by the terminal device of the worker.

FIG. 14 shows a screen 2140 displayed by terminal device 20. Referring to FIG. 14, screen 2140 includes a list 2143 and an object image 2135. Screen 2140 shows a case where the nature of anomaly No. 1 is different from that of anomaly No. 1 described above. Remedy procedure No. 3 is different from remedy procedure No. 3 of FIG. 13.

Specifically, anomaly No. 1 shown in FIG. 14 relates to troubleshooting on communication errors. Terminal device 20 displays the information on a line during work (e.g., anomaly status, anomaly of duplicate IPs) in list 2143.

Object image 2135 visually displays progress of the work, similarly to object image 2124 of FIG. 12. This allows the worker to actually feel that an anomaly (trouble) is moving toward a solution through his/her work.

Figure 15:
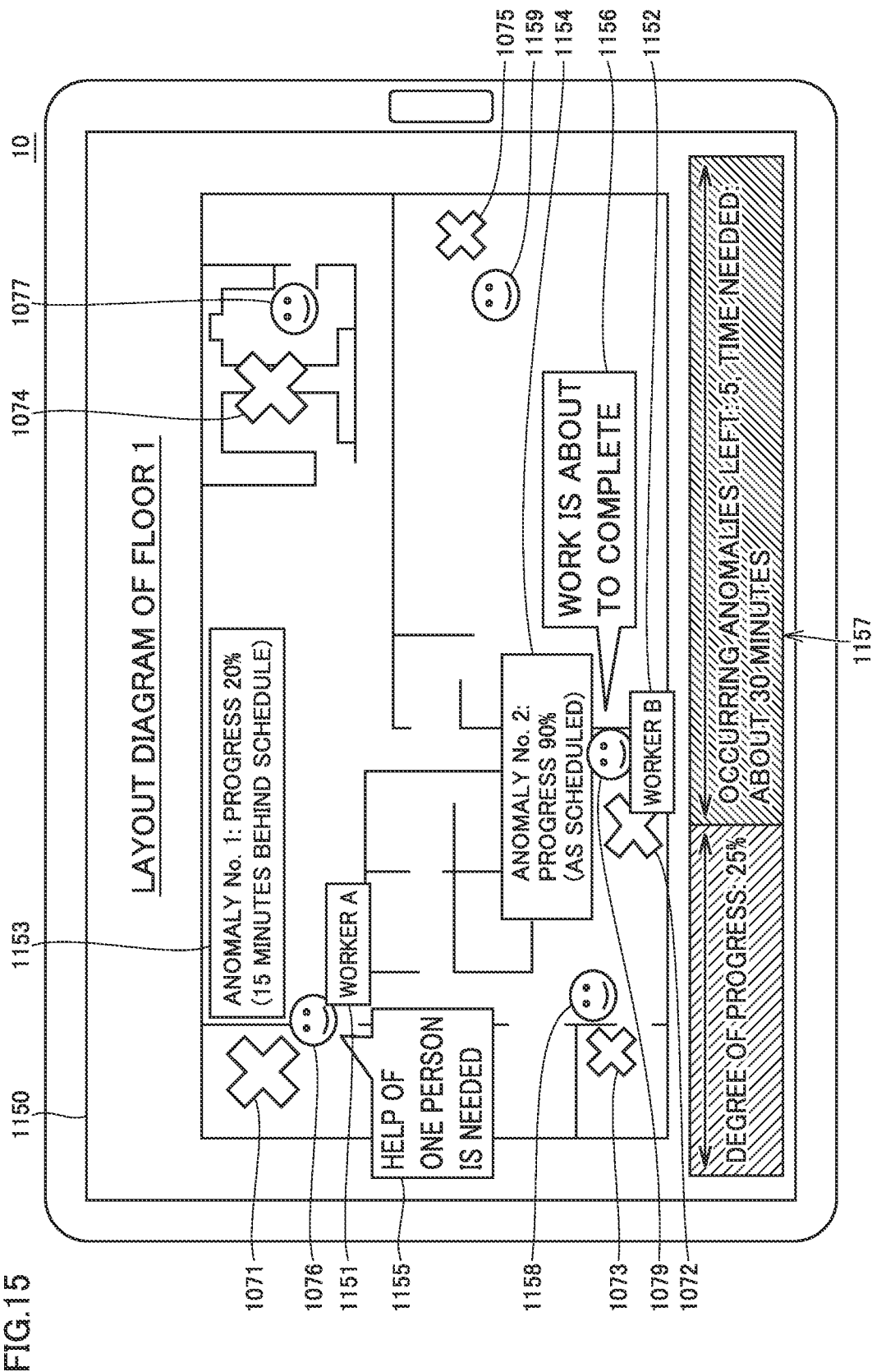
FIG. 15 shows a screen displayed by the terminal device of the work supervisor.

FIG. 15 shows a screen 1150 displayed by terminal device 10. Referring to FIG. 15, screen 1150 includes object images 1153, 1154, 1157, each indicating progress, object images 1155, 1156, each indicating a message from the worker, icons 1071, 1072, 1073, 1074, each indicating the location of occurrence of an anomaly, icons 1076, 1077, 1078, 1079, 1080, each indicating the current position of the worker, and object images 1151, 1152, each indicating the identification information (e.g., a name) of the worker.

The work supervisor can check object images 1153, 1154 to grasp the progress of recovery work by each worker. The work supervisor can check object image 1157 to grasp the overall progress.

The work supervisor can check object images 1155, 1156 to check the message sent from the worker. This allows the worker to take the next remedy immediately.

The work supervisor can immediately learn which worker has sent the message with reference to object images 1151, 1152. Note that terminal device 10 can display the identification information of the worker in association with an icon indicating the current position of the worker even when terminal device 10 has received no message.

Figure 16:
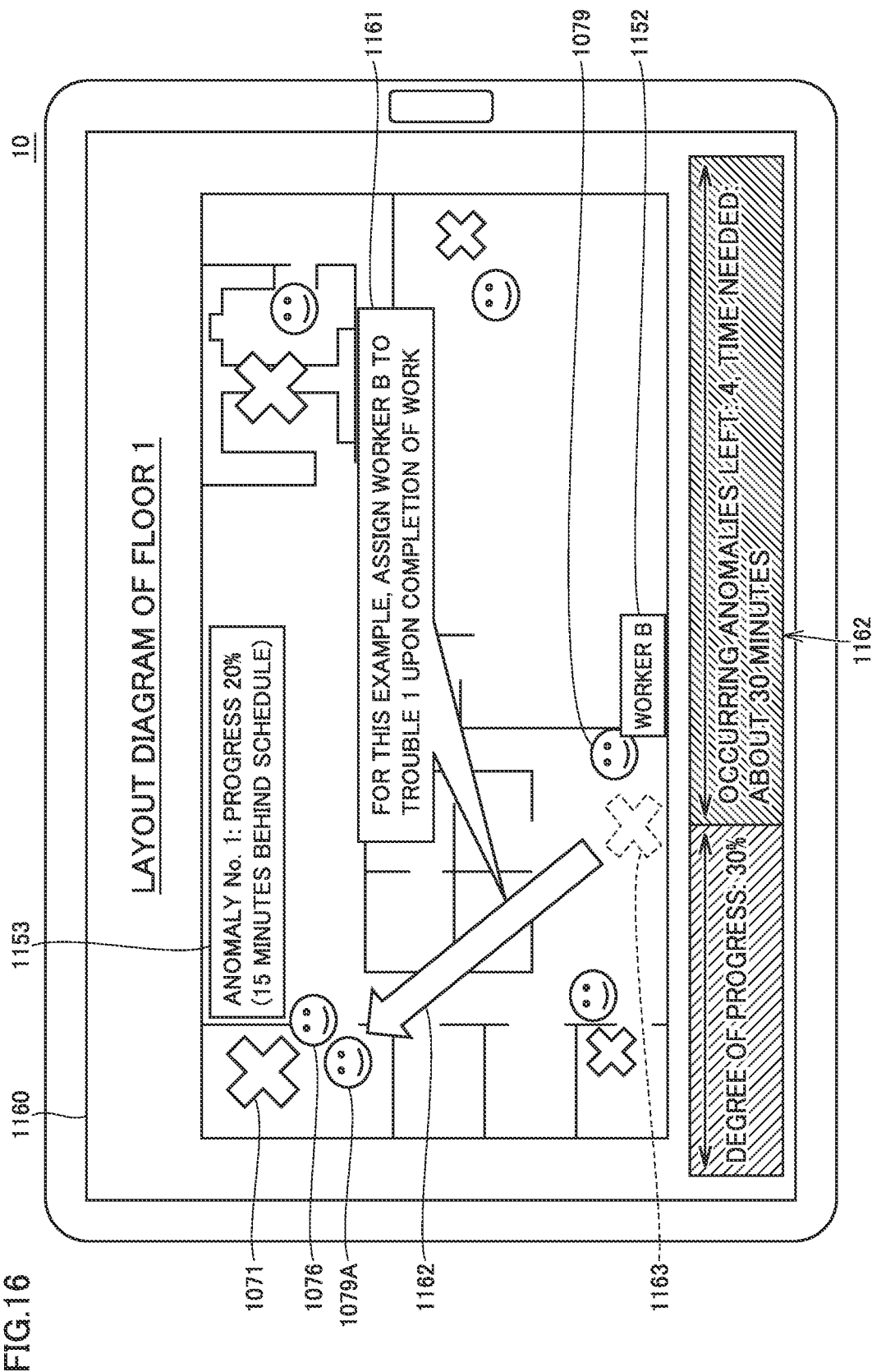
FIG. 16 shows a screen displayed by the terminal device of the work supervisor.

FIG. 16 shows a screen 1160 displayed by terminal device 10. Referring to FIG. 16, screen 1160 is a screen displayed after the work supervisor instructs worker B to help worker A with the progress being as shown in FIG. 15. Specifically, screen 1160 is a screen displayed after the work supervisor updates assignment in consideration of the progress of workers A, B and worker B heads for the location of worker A (the location of occurrence of an anomaly that worker A was in charge of).

As such screen 1160 is displayed by terminal device 10, the work supervisor can check that the worker has traveled appropriately. The work supervisor can also check object image 1157 to grasp the overall progress.

FIG. 17 shows a screen 1170 displayed by terminal device 10 which has accepted a report on the work progress from terminal device 20 of the worker. Referring to FIG. 17, screen 1170 includes a trouble list 1171.

Trouble list 1171 is different from trouble list 1111 shown in FIG. 11 in that trouble list 1171 further includes a column indicating a degree of progress of each work. In trouble list 1171, the progress of each anomaly is shown in the column for a degree of progress of each work. In trouble list 1171, a delay time from a scheduled time is also displayed as progress. Trouble list 1171 is subjected to color coding according to status. As such trouble list 1171 is displayed by terminal device 10, the work supervisor can immediately grasp the progress of recovery work for each anomaly. Also, trouble list 1171 serves as useful information when the work supervisor considers an update of the assignment of workers.

The work supervisor needs to assign workers in consideration of the degrees of importance of the respective anomalies. In the event of anomalies in a plurality of lines, the work supervisor needs to assign workers in consideration of a degree of priority regarding an anomaly of which line should be preferentially addressed. Since one line normally has a plurality of steps, in the event of anomalies in two or more of the steps, the work supervisor needs to assign workers in consideration of the respective degrees of priority of the two or more anomalies.

In work support system 1, the work supervisor thus assigns workers using such degree of importance and degree of priority. Such degree of importance and degree of priority are pre-stored in server 3 and are displayed in terminal device 10.

Although the description has been given using an example in which trouble list 1171 does not have the column for degrees of emergency in trouble list 1111, shown in FIG. 11, the present disclosure is not limited thereto. Trouble list 1171 may have the column for degrees of emergency.

Figure 18:
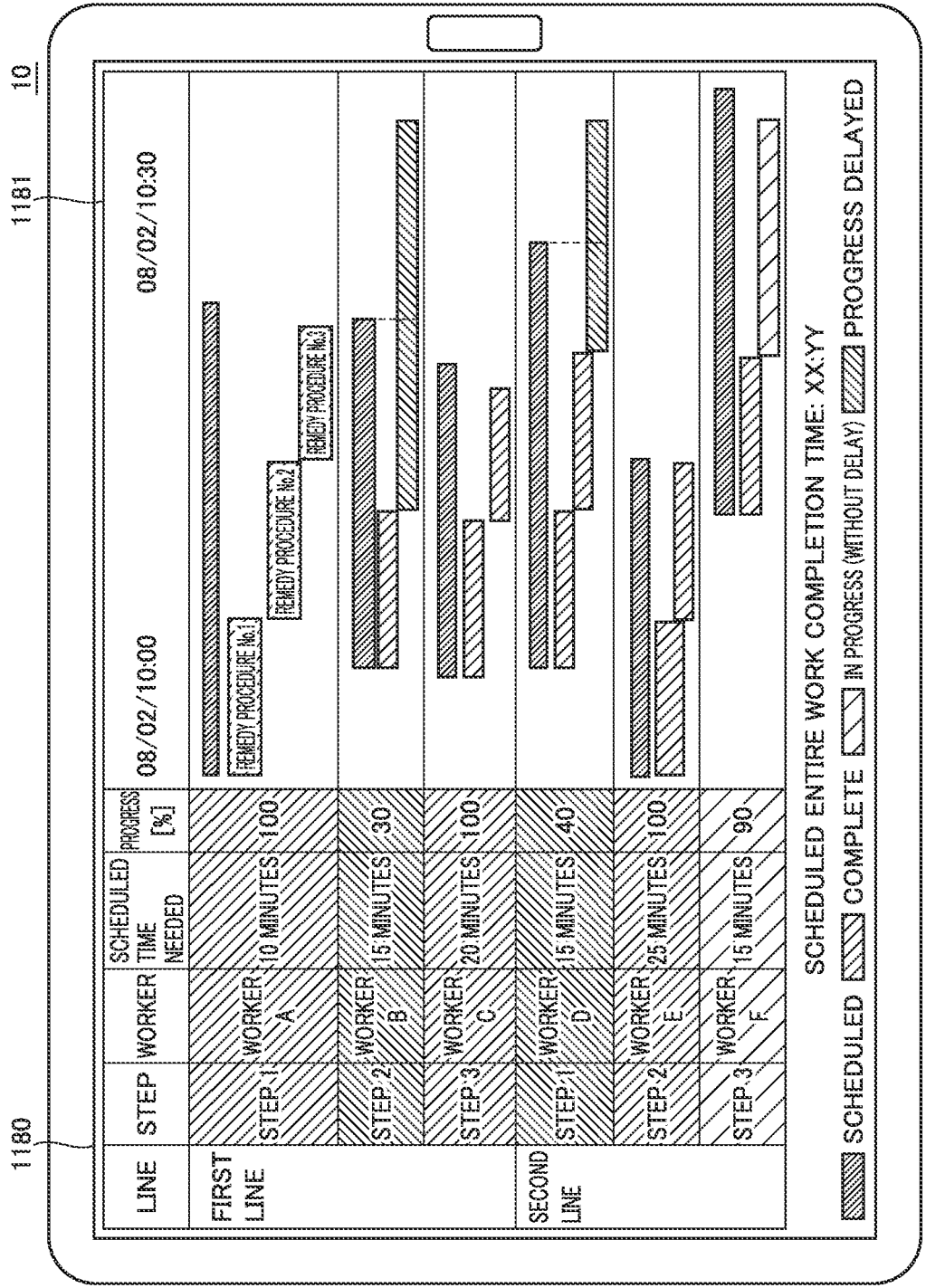
FIG. 18 shows a screen displayed by the terminal device of the work supervisor.

FIG. 18 shows a screen 1180 displayed by terminal device 10. Referring to FIG. 18, screen 1180 is a progress management screen. Screen 1180 includes a progress table 1181 showing progress.

Progress table 1181 includes a column for lines, a column for steps, a column for workers, a column for scheduled times needed, a column for degrees of progress, and a column for Gantt charts. It is assumed here that one anomaly occurs in one step.

The Gantt chart shows a chart of a plan, a chart of a complete remedy procedure, a chart of a remedy procedure proceeding without any delay, and a chart of a remedy procedure behind schedule for each step in a manner distinguishable by the work supervisor. An overall scheduled work completion time is updated depending on progress.

This progress management screen allows the work supervisor to grasp the whole picture of the progress of recovery work.

BRIEF SUMMARY (1) Information processor 700 (specifically, terminal device 10) displays a list of a plurality of anomalies. Information processor 700 determines whether or not recovery from each anomaly has been performed based on the progress information. In display of the list, information processor 700 displays items for the anomaly, recovery from which is determined to have been performed, differently from items for the anomaly, recovery from which is determined to have not been performed.

Such a configuration allows the work supervisor to immediately distinguish between an anomaly, recovery from which has been performed, and an anomaly, recovery from which is yet to be performed.

(2) Each terminal device 20 displays a text box for transmitting a message. Each terminal device 20 transmits the message input in the text box to information processor 700.

Such a configuration allows the worker to communicate the contents that the worker wants to convey to the work supervisor, using terminal device 20.

(3) Each terminal device 20 displays the contents for anomalies in a form of a checklist. The input operation for inputting progress information is a check operation to the checklist.

With such a configuration, terminal device 10 of the work supervisor is notified of progress information through an operation of checking a checklist.

Variations

There are many workers with different languages and cultures. It is thus desirable that a display color of an icon (symbol) be unified, in addition to the selection of a language described above.

Workers include older workers, and accordingly, processing of increasing visibility is preferably performed by, for example, making the character size selectable. It is also preferable to simplify an operation for enhanced operability.

Moreover, there may be only a few workers and one worker may need to manage and operate many devices. Thus, server 3 preferably stores information on the number of in-stock devices to be replaced and a time required for one worker to handle a plurality of anomalies.

(c4. Step S4)

Figure 19:
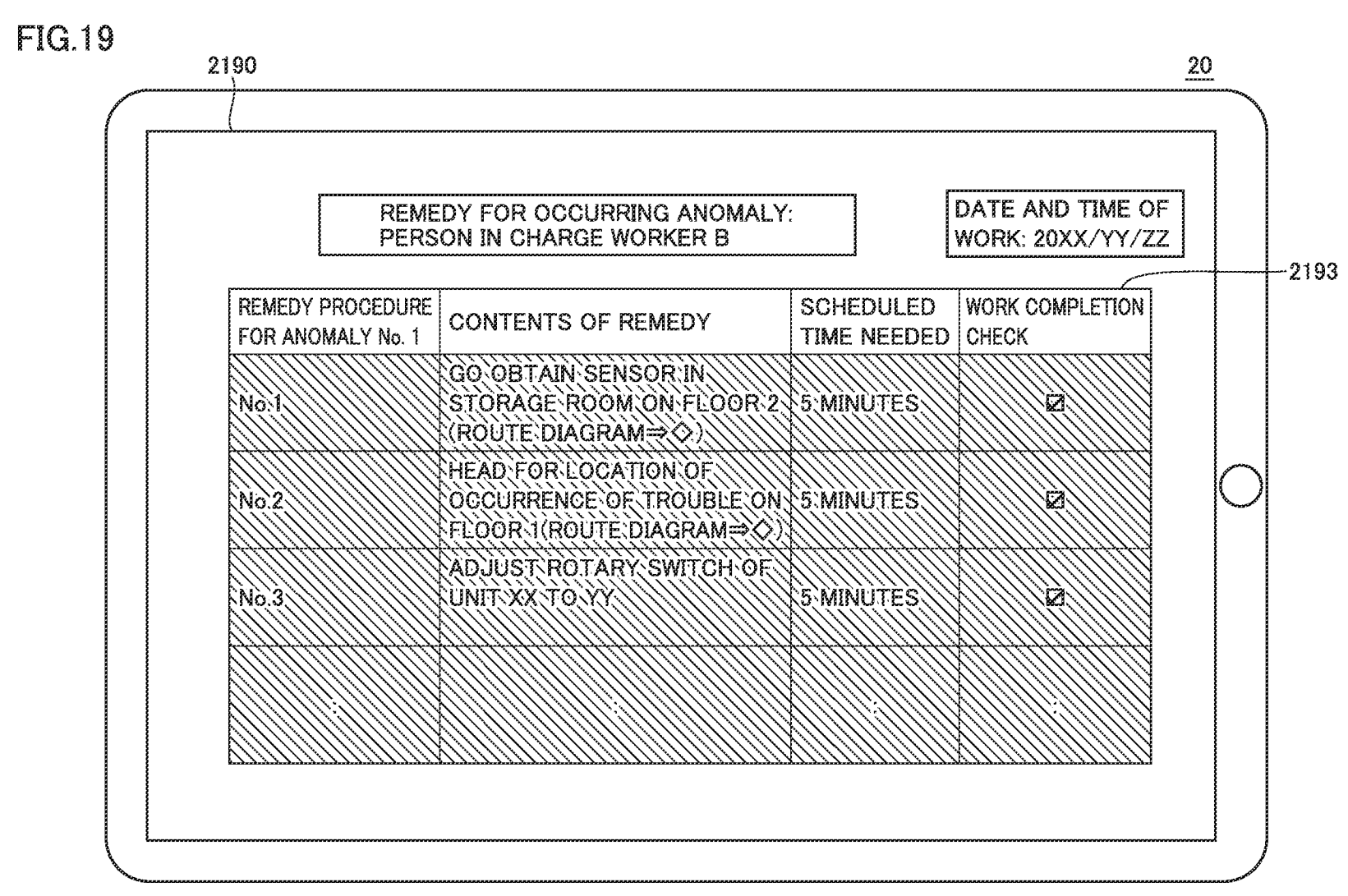

FIG. 19 shows a screen 2190 displayed by terminal device 20 of the worker.

Referring to FIG. 19, screen 2190 includes a list 2193. List 2193 shows a state in which remedy procedure No. 2 and remedy procedure No. 3 are checked in list 2133 of FIG. 13. Since all the remedy procedures are complete, all the remedy procedures are coded in the same color, unlike list 2133 of FIG. 13.

As described above, checking the checkbox serves as evidence of work completion. Specifically, when all the checkboxes are checked by the worker, server 3 creates a work completion report regarding one anomaly assigned to the worker. This eliminates the need for the worker to separately create a work complete report.

Figure 20:
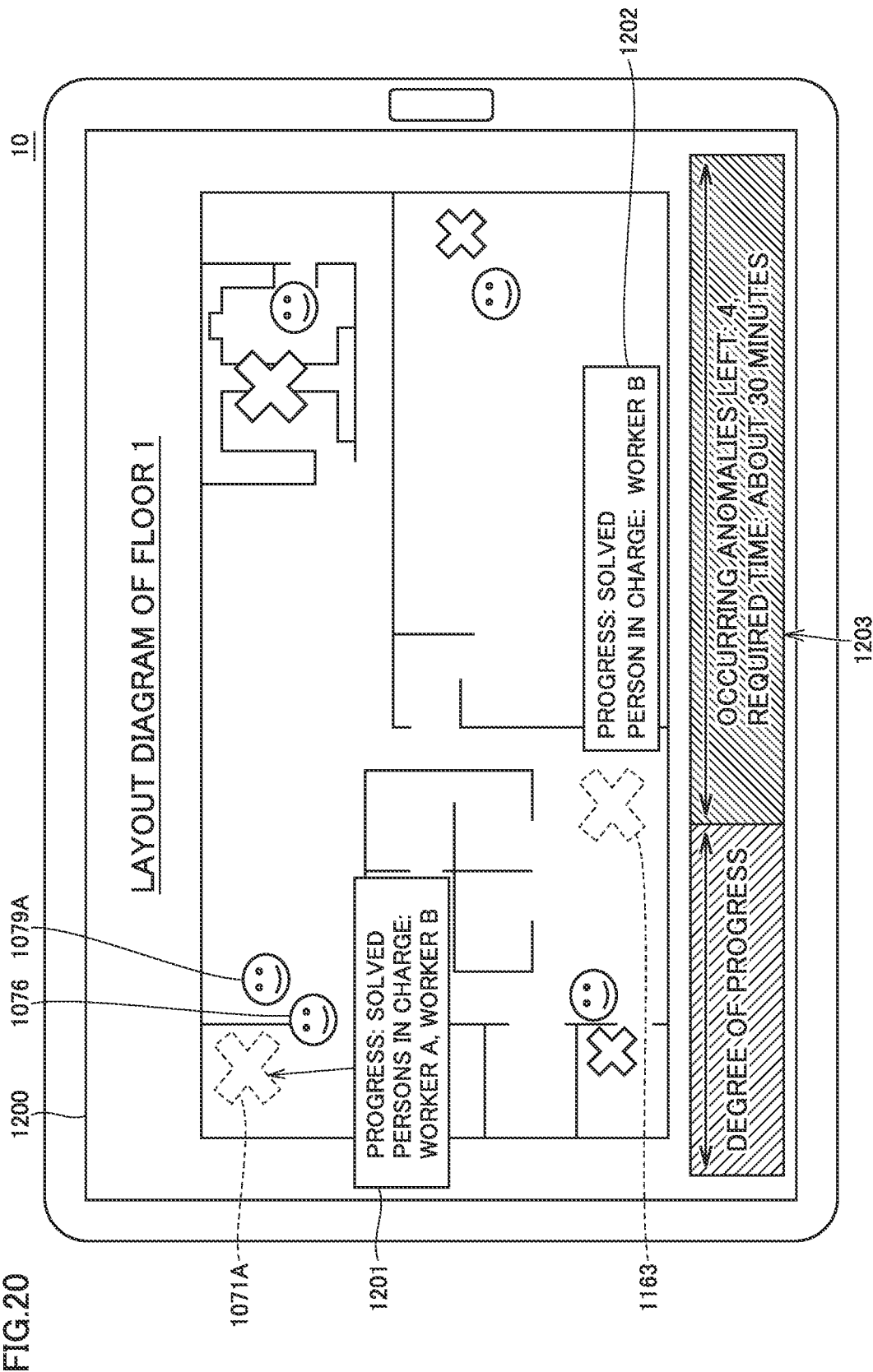
FIG. 20 shows a screen displayed by the terminal device of the work supervisor.

FIG. 20 shows a screen 1200 displayed by terminal device 10. Referring to FIG. 20, screen 1200 includes object images 1201, 1202, each indicating that an anomaly has been solved and the name(s) of the worker(s) assigned to the anomaly, icons 1071A, 1163, each indicating the location of occurrence of a solved anomaly, icons 1076, 1079A, each indicating the current position of the worker, and an object image 1203, showing progress.

In terminal device 10, the screen of terminal device 10 is updated in cooperation with server 3 every time one anomaly recover work completes.

FIG. 21 shows a screen 1210 displayed by terminal device 10. Referring to FIG. 21, screen 1210 includes a trouble list 1211. Trouble list 1211 is a list after the update of trouble list 1111 (see FIG. 11). Since anomalies No. 1 and No. 2 have been solved, solved anomalies and unsolved anomalies are displayed differently in trouble list 1211. Typically, the color of the solved anomalies are changed to display solved anomalies and unsolved anomalies differently. This allows the worker to immediately grasp unsolved anomalies.

<D. Hardware Configuration>

(d1. Server 3, Database Server 4)

Figure 22:
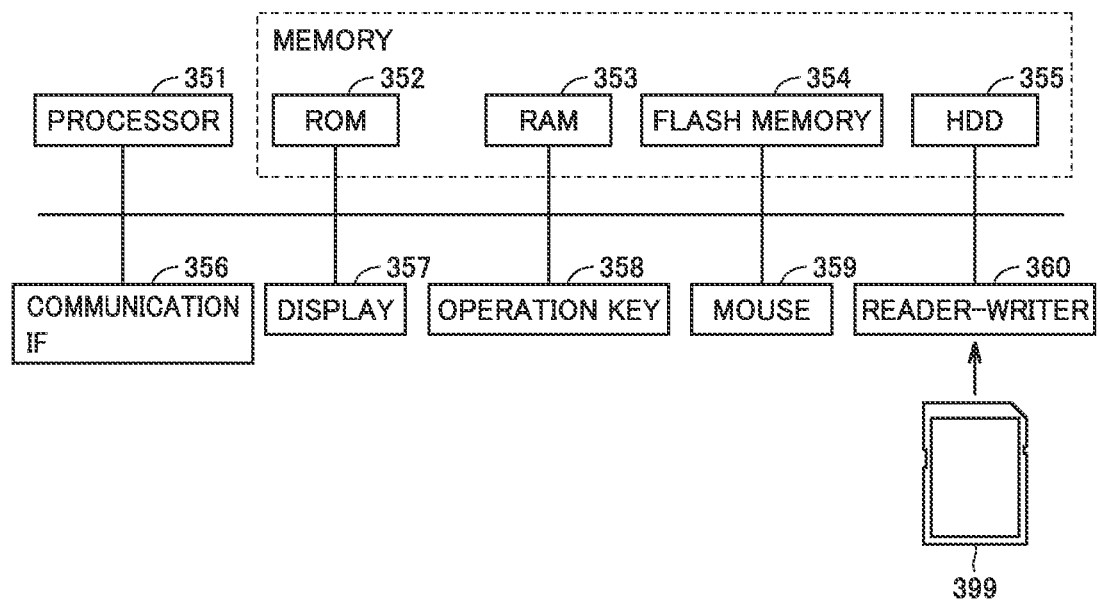
FIG. 22 is a schematic diagram showing an example hardware configuration of a server.

FIG. 22 is a schematic diagram showing an example hardware configuration of server 3.

Referring to FIG. 22, server 3 typically includes a processor 351, such as a CPU (Central Processing Unit), which executes a program, a ROM (Read Only Memory) 352, which stores data in a nonvolatile manner, a RAM (Random Access Memory) 353, which stores data generated by processor 251 executing the program or data input through an input device in a volatile manner, a flash memory 354, which stores data in a nonvolatile manner, an HDD (Hard Disk Drive) 355, which stores data in a nonvolatile manner, a communication IF (Interface) 356, a display 357, an operation key 358, a mouse 359, and a reader-writer 360, which reads and writes data from and to a storage medium 399. These components are connected to each other by a data bus.

Communication IF 356 is an interface for communications with any other device.

Processing in server 3 is implemented by each hardware and software executed by processor 351. Such software may be pre-stored in HDD 355. Software may be stored in any other storage medium to be commercially available as a program product. Alternatively, software may be provided as a downloadable program product by a so-called information provider connected to the Internet. Such software is read by a reader from its storage medium or downloaded via communication IF 356 or the like, to be temporarily stored in HDD 355. The software is read by processor 351 from HDD 355 and is stored in RAM 353 in a form of an executable program. Processor 351 executes the program.

The components of server 3 illustrated in FIG. 22 are commonly used ones. It can thus be said that the essential part of the present invention is software stored in RAM 353, flash memory 354, HDD 355, or the storage medium. It can also be said that the essential part is software downloadable via a network. The operation of each hardware of server 3 is well known, detailed description of which will not be repeated.

Since database server 4 includes a configuration similar to that of server 3, the hardware configuration of database server 4 will not be described repeatedly.

(d2. Terminal Devices 10, 20)

Figure 23:
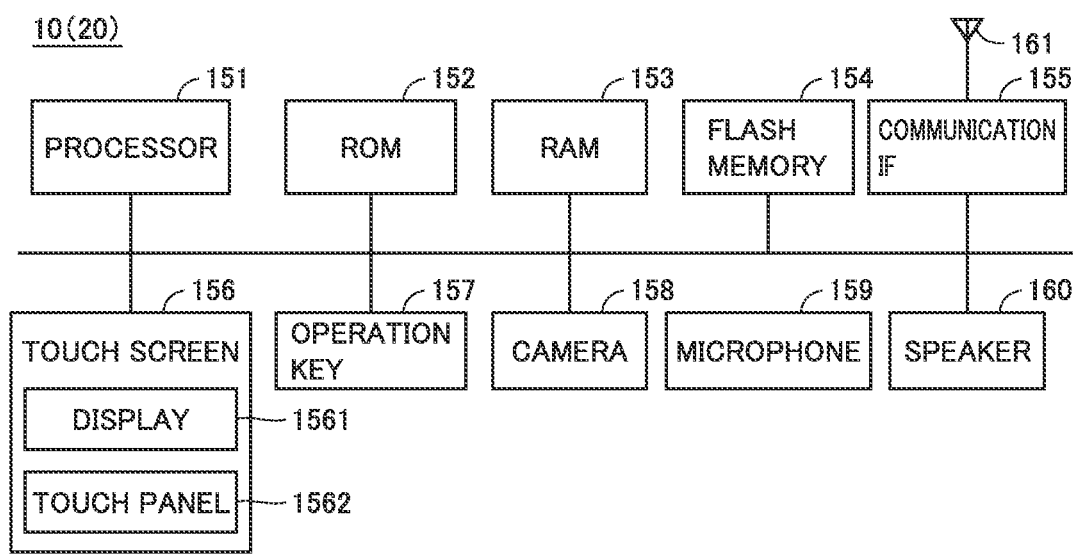
FIG. 23 is a schematic diagram showing an example hardware configuration of the terminal device of the work supervisor.

FIG. 23 is a schematic diagram showing an example hardware configuration of terminal device 10.

Referring to FIG. 23, terminal device 10 includes, as main components, a processor 151, such as a CPU, which executes a program, a ROM 152, which stores data in a nonvolatile manner, a RAM 153, which stores data generated by processor 151 executing the program or data input via an input device in a volatile manner, a flash memory 154, which stores data in a nonvolatile manner, a communication IF 155, a touch screen 156, an operation key 157, a camera 158, a microphone 159, a speaker 160, and an antenna 161. Components 151 to 161 are connected to each other by a data bus.

Touch screen 156 is composed of a display 1561 and a touch panel 1562. Antenna 161 is an antenna for communication IF 155. Communication IF 155 performs processing of transmitting data to server 3 and processing of receiving data transmitted from server 3. Touch screen 156 is a device for displaying various pieces of data and accepting an operation input.

Processing in terminal device 10 is implemented by software executed by each hardware and processor 151. Such software may be pre-stored in flash memory 154. Software may be stored in any other storage medium to be commercially available as a program product. Alternatively, software may be provided as a downloadable program product by a so-called information provider connected to the Internet. Such software is read by a reader from its storage medium or downloaded via communication IF 155 or the like, to be temporarily stored in flash memory 154. The software is read from flash memory 154 by processor 151 and is stored in RAM 153 in a form of an executable program. Processor 151 executes the program.

The components of terminal device 10 illustrated in FIG. 23 are commonly used ones. It can thus be said that the essential part of the present invention is software stored in RAM 153, flash memory 154, or the storage medium. It can also be said that the essential part is software downloadable via a network. The operation of each hardware of terminal device 10 is well known, detailed description of which will not be repeated.

Since each terminal device 20 includes a configuration similar to that of terminal device 10, the hardware configuration of each terminal device 20 will not be described repeatedly.

(d3. PLCs 511, 521)

Figure 24:
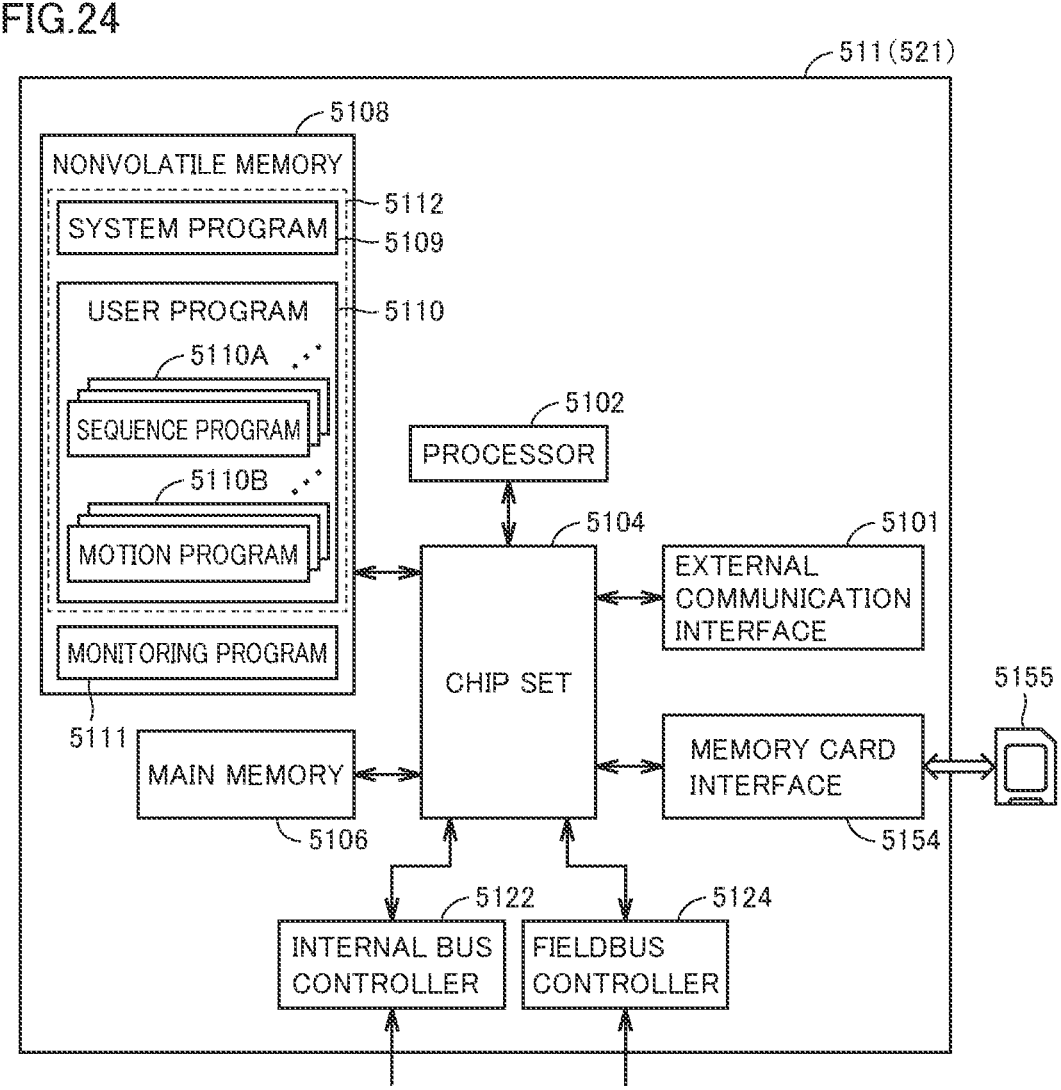
FIG. 24 is a schematic diagram showing an example hardware configuration of a PLC.

FIG. 24 is a schematic diagram showing an example hardware configuration of PLC 511.

PLC 511 includes an external communication interface 5101, a processor 5102 such as CPU or MPU (Micro-Processing Unit), a chip set 5104, a volatile main memory 5106, a nonvolatile memory 5108, an internal bus controller 5122, a fieldbus controller 5124, and a memory card interface 5154.

External communication interface 5101 controls exchange of data through various wired/wireless networks.

Processor 5102 reads a control program 5112 stored in nonvolatile memory 5108 such as a flash memory, deploys program 5112 to main memory 5106, and executes program 5112, to thereby appropriately control a servo driver (not shown) or the like. Control program 5112 includes various programs for controlling PLC 511. As an example, control program 5112 includes, for example, a system program 5109, a user program 5110, and a monitoring program 5111. System program 5109 includes an operation code for providing basic functions of PLC 511, such as data input and output processing and execution timing control. User program 5110 is appropriately designed in accordance with a control target, and includes a sequence program 5110A for executing sequence control and a motion program 5110B for executing motion control. Monitoring program 5111 includes an operation code for monitoring an anomaly. Control program 5112 is, for example, a PLC program described in the ladder language or ST (Structured Text) language.

Chip set 5104 controls each component to implement processing as the entire PLC 511.

Internal bus controller 5122 is an interface that exchanges data with various devices coupled with PLC 511 through an internal bus. Remote IO devices 512, 514 are connected as examples of such devices.

Fieldbus controller 5124 is an interface that exchanges data with various devices coupled with PLC 511 through a fieldbus. A servo driver (not shown) is connected as an example of such devices. The servo driver controls the servo motor in accordance with a command from PLC 511. Consequently, various driving devices (e.g., arm robot 515) connected to the servo motor are driven.

Internal bus controller 5122 and fieldbus controller 5124 can provide appropriate commands to a device connected thereto and obtain any type of data (including a measured value) managed by the device. Internal bus controller 5122 and/or fieldbus controller 5124 function(s) as an interface for exchanging data with the servo driver.

Memory card interface 5154 is detachably connected with a memory card 5155 (e.g., SD card), which is an example external storage medium. PLC 511 writes and reads data to and from memory card 5155 via memory card interface 5154.

Since PLC 521 has a configuration similar to that of PLC 511, the hardware configuration of PLC 521 will not be described repeatedly.

<E. Functional Configuration>

(e1. Terminal Device 10)

Figure 25:
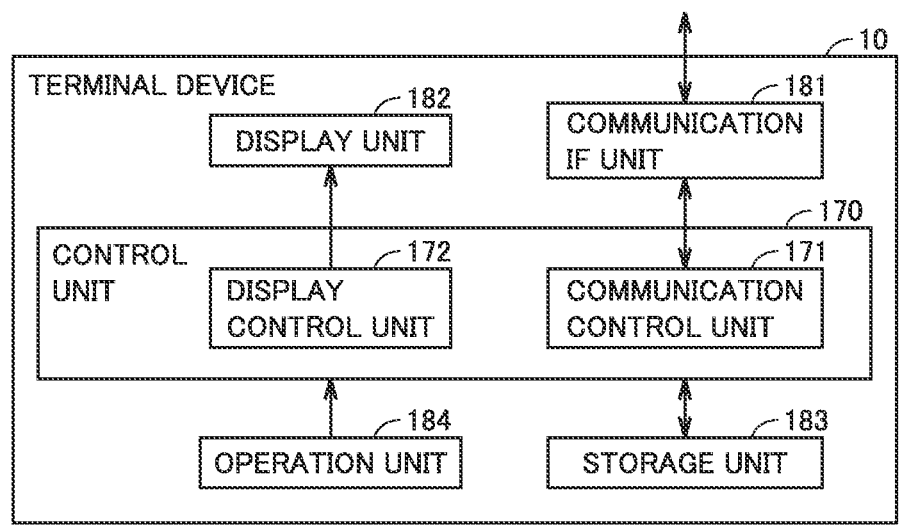
FIG. 25 is a functional block diagram for illustrating a functional configuration of the terminal device of the work supervisor.

FIG. 25 is a functional block diagram for illustrating a functional configuration of terminal device 10.

Referring to FIG. 25, terminal device 10 includes a control unit 170, a communication IF (InterFace) unit 181, a display unit 182, a storage unit 183, and an operation unit 184. Control unit 170 includes a communication control unit 17 and a display control unit 172.

Control unit 170 controls the overall operation of terminal device 10. Control unit 170 is typically implemented by processor 151 executing an operating system and a program that are pre-stored in terminal device 10.

Communication IF unit 181 is an interface for communications with any other device, such as server 3. Communication IF unit 181 corresponds to communication IF 155 of FIG. 23. Communication IF unit 181 executes various pieces of processing necessary for communications, based on control by communication control unit 171.

Storage unit 183 stores various pieces of data. Storage unit 183 corresponds to ROM 152, RAM 153, and flash memory 154 of FIG. 23.

Display unit 182 displays various pieces of information based on control by display control unit 172. Display unit 182 corresponds to display 1561 of FIG. 23.

Display control unit 172 causes display unit 182 to display, as examples of the screen described above, screen 1070 shown in FIG. 7, screen 1080 shown in FIG. 8, screen 1090 shown in FIG. 9, screen 1100 shown in FIG. 10, screen 1110 shown in FIG. 11, screen 1150 shown in FIG. 15, screen 1160 shown in FIG. 16, screen 1170 shown in FIG. 17, screen 1180 shown in FIG. 18, screen 1200 shown in FIG. 20, and screen 1210 shown in FIG. 21.

A specific example is as follows. Display control unit 172 causes display unit 182 to display nature of a plurality of anomalies. Display control unit 172 also causes display unit 182 to display the progress information described above. Display control unit 172 further causes display unit 182 to display support information for supporting the assignment of workers described above. Display control unit 172 also causes display unit 182 to display a determination result on whether or not all pieces of recovery work will complete within the target completion time. Display control unit 172 further causes display unit 182 to display a response to an inquiry (inquiry to a worker) as to whether or not the worker can handle an anomaly.

Display control unit 172 causes display unit 182 to display a list of a plurality of anomalies (trouble list). In this occasion, display control unit 172 causes display unit 182 to display items for an anomaly, recovery from which is determined to have been performed, differently from items for an anomaly, recovery from which is determined to have not been performed.

Operation unit 184 accepts an input operation of a work supervisor. Operation unit 184 corresponds to touch panel 1562 of FIG. 23.

After the nature of the plurality of anomalies are displayed in display unit 182, operation unit 184 accepts an input operation for assignment of a worker who is to handle an anomaly among a plurality of workers for each anomaly. When operation unit 184 accepts the input operation, communication control unit 171 transmits the nature of the anomaly to be handled by a worker to terminal device 20 used by the worker via communication IF unit 181.

After the progress information described above is displayed in display unit 182, operation unit 184 further accepts an input operation for updating the assignment of a worker who is to handle each anomaly. Based on the assignment updated, communication control unit 171 transmits the nature of an anomaly to be handled by a worker to terminal device 20 used by the worker via communication IF unit 181.

Operation unit 184 further accepts an input operation for setting a target completion time for recovering from a plurality of anomalies that have occurred in controller system 500. Operation unit 184 further accepts an input operation for changing the assignment of workers when it is determined that the work to recover from a plurality of anomalies will not complete within the target completion time. Operation unit 184 also accepts an input of a message to be transmitted to each worker.

(e2. Terminal Device 20)

Figure 26:
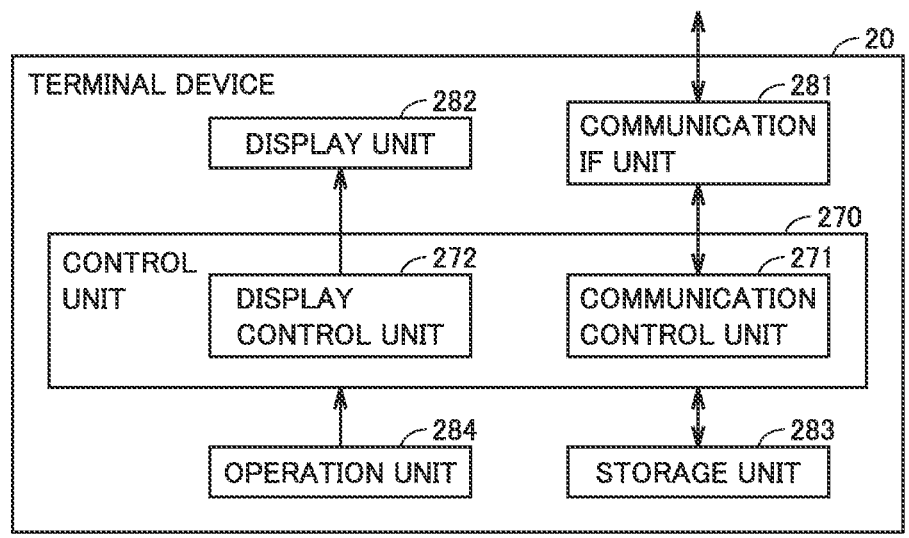
FIG. 26 is a functional configuration diagram for illustrating a functional configuration of the terminal device of the worker.

FIG. 26 is a functional block diagram for illustrating a functional configuration of terminal device 20.

Referring to FIG. 26, terminal device 20 includes a control unit 270, a communication IF unit 281, a display unit 282, a storage unit 283, and an operation unit 284. Control unit 270 includes a communication control unit 27 and a display control unit 272.

Control unit 270 controls the overall operation of terminal device 20. Control unit 270 is typically implemented by processor 251 executing the operating system and the program that are pre-stored in terminal device 20.

Communication IF unit 281 is an interface for communications with any other device, such as server 3. Communication IF unit 281 corresponds to communication IF 155 of FIG. 23. Communication IF unit 281 executes various pieces of processing based on control by communication control unit 271.

Storage unit 283 stores various pieces of data. Storage unit 283 corresponds to ROM 152, RAM 153, and flash memory 154 of FIG. 23.

Display unit 282 displays various pieces of information based on control by display control unit 272. Display unit 282 corresponds to display 1561 of FIG. 23.

Display control unit 272 causes display unit 282 to display, as examples of the screen described above, screen 2120 shown in FIG. 12, screen 2130 shown in FIG. 13, screen 2140 shown in FIG. 14, and screen 2190 shown in FIG. 19.

A specific example is as follows. Display control unit 272 causes display unit 282 to display the contents of a remedy (typically, remedy manual) for an anomaly. Display control unit 272 also causes display unit 282 to display an ideal work time for recovering from an anomaly to be handled by a worker who uses terminal device 20. Upon acceptance of the nature of an anomaly from information processor 700, display control unit 272 further causes display unit 282 to perform a display for inquiring of the worker whether or not the worker can handle the anomaly.

Display control unit 272 causes display unit 282 to display a text box for transmitting a message to the work supervisor. In this case, communication control unit 271 transmits the message input in the text box to information processor 700 via communication IF unit 281. Display control unit 272 also causes display unit 282 to display the contents of the remedies for anomalies in a form of a checklist.

Operation unit 284 accepts an input operation of the work supervisor. Operation unit 284 corresponds to touch panel 1562 of FIG. 23.

Operation unit 284 accepts an input operation for inputting progress information indicating the progress of a remedy. In this case, communication control unit 271 transmits the progress information to information processor 700 via communication IF unit 281. Operation unit 284 accepts an input of a response of a worker to an inquiry (inquiry from the work supervisor) as to whether or not the worker can handle an anomaly. In this case, communication control unit 271 transmits the response to information processor 700 via communication IF unit 281.

Operation unit 284 accepts an input (an input to a text box) of a message to the work supervisor. In this case, communication control unit 271 transmits the input message to information processor 700 via communication IF unit 281. Operation unit 284 also accepts a check operation to a checklist.

(e3. Server 3)

Figure 27:
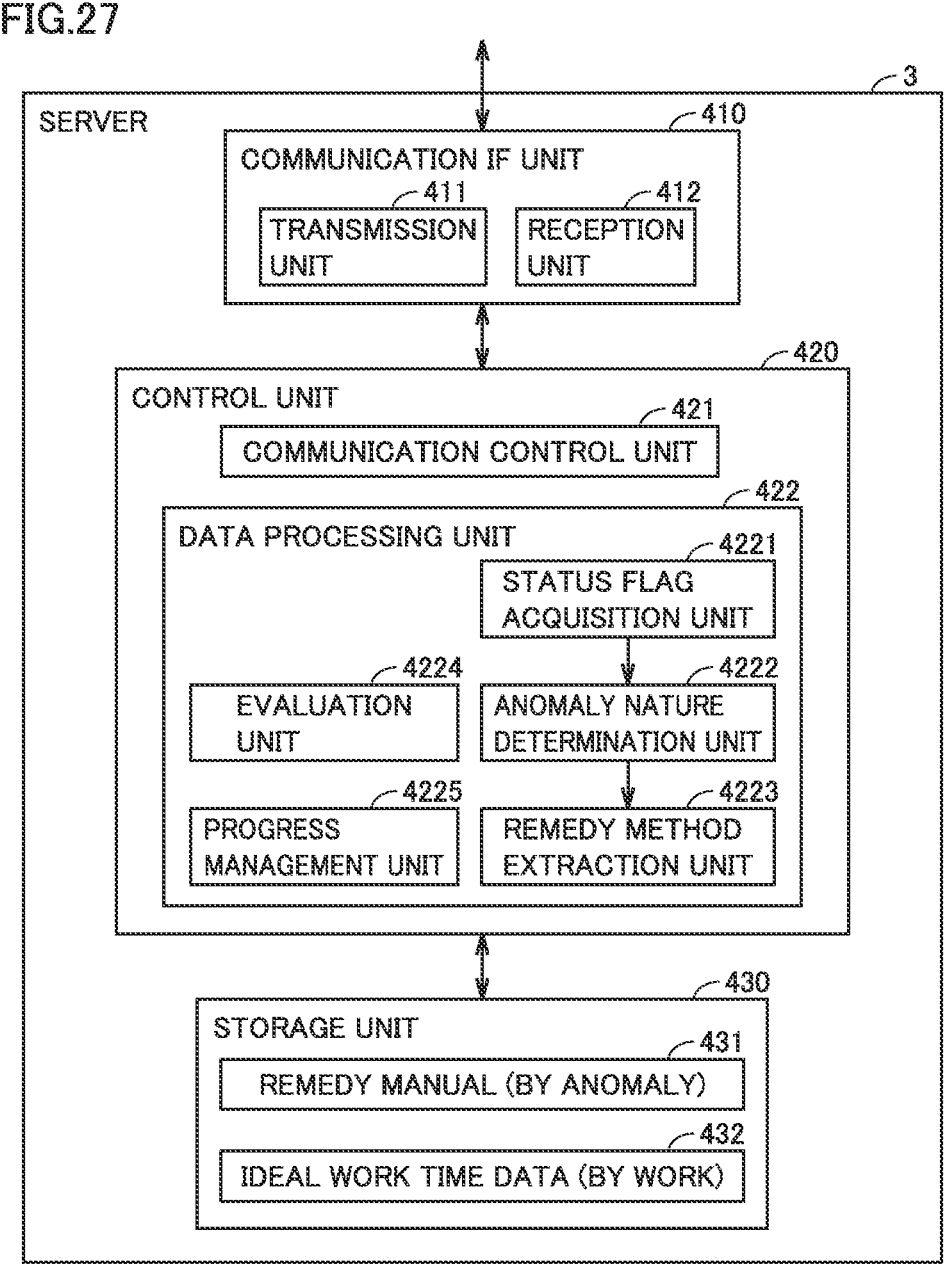
FIG. 27 is a functional block diagram for illustrating a functional configuration of the server.

FIG. 27 is a functional block diagram for illustrating a functional configuration of server 3.

Referring to FIG. 27, server 3 includes a communication IF unit 410, a control unit 420, and a storage unit 430. Communication IF unit 410 includes a transmission unit 411 and a reception unit 412. Control unit 420 includes a communication control unit 421 and a data processing unit 422. Data processing unit 422 includes a status flag acquisition unit 4221, an anomaly nature determination unit 4222, a remedy method extraction unit 4223, an evaluation unit 4224, and a progress management unit 4225.

Storage unit 430 stores a remedy manual 431 by anomaly and ideal work time data 432 indicating an ideal work time by work. Storage unit 430 also stores a degree of emergency for each anomaly and information on skills required for each anomaly.

Control unit 420 controls an overall operation of server 3. Control unit 420 is typically implemented by processor 351 executing the operating system and the program that are pre-stored in server 3.

Communication IF unit 410 is an interface for communications with any other device. Communication IF unit 410 executes various pieces of processing required for communications based on control by communication control unit 421. Transmission unit 411 of communication IF unit 410 transmits data over network N1. Transmission unit 411 also executes signal processing for data transmission. Reception unit 412 receives data from network N1. Reception unit 412 also executes signal processing for received data.

Data processing unit 422 of control unit 420 performs data processing for executing a series of work support including the assignment of workers described above. Data processing unit 422 will now be described.

Status flag acquisition unit 4221 obtains status flags stored in PLCs 511, 521 from PLCs 511, 521. There are any number (types) of status flags corresponding to the configuration of controller system 500. What status is stored as a flag is predetermined. Typically, when the flag of the status flag is on, the occurrence of an anomaly is indicated. Since the status flag stored in the PLC has been conventionally known, description thereof will not be repeated herein.

Anomaly nature determination unit 4222 determines what type of anomaly has occurred based on the status flag. Remedy method extraction unit 4223 extracts a remedy manual for the determined anomaly from the remedy manual stored in storage unit 430.

Based on the assignment of workers performed by the work supervisor, evaluation unit 4224 performs an evaluation using the evaluation function described above. The evaluation result is transmitted to terminal device 10. In the evaluation, an ideal work time by work, stored in storage unit 430, is used.

Progress management unit 4225 manages the progress of recovery work for each anomaly and all anomalies based on the progress information received from each terminal device 20. Progress management unit 4225 creates a Web page for displaying such progress in terminal device 10. Progress management unit 4225 also creates a Web page including the progress information described above in order to cause terminal device 20 of the worker to display the progress.

(e4. Database Server 4)

Figure 28:
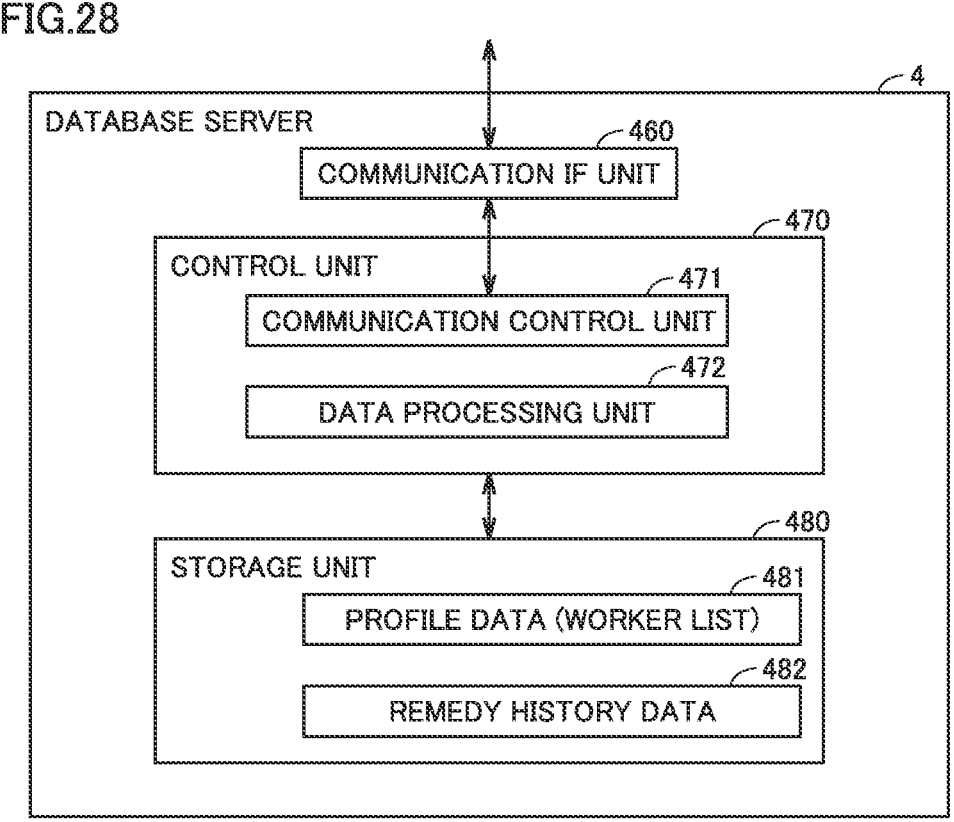
FIG. 28 is a functional block diagram for illustrating a functional configuration of a database server.

FIG. 28 is a functional block diagram for illustrating a functional configuration of database server 4.

Referring to FIG. 28, database server 4 includes a communication IF unit 460, a control unit 470, and a storage unit 480. Control unit 470 includes a communication control unit 471 and a data processing unit 472.

Storage unit 480 stores profile data 481 as a worker list and remedy history data 482 indicating the past processing history. Storage unit 480 also stores information on a worker who was in charge of configuration setting and wiring.

Control unit 470 controls the overall operation of database server 4. Control unit 470 is typically implemented by processor 351 executing the operating system and the program that are pre-stored in database server 4.

Communication IF unit 460 is an interface for communications with any other device. Communication IF unit 460 executes various pieces of processing necessary for communications based on control by communication control unit 471.

Data processing unit 472 of control unit 470 executes data processing corresponding to a command from server 3. Data processing unit 472 will now be described.

Based on the command from server 3, data processing unit 472 extracts remedy history (contents of a remedy, information on a worker) about a similar anomaly from past remedy history data 482 stored in storage unit 480, and transmits the remedy history to server 3. Data processing unit 472 also transmits information on a worker who was in charge of configuration setting and wiring to server 3. Data processing unit 472 further reads profile data 481 stored in storage unit 480 and transmits information on the read profile (e.g., skills, experience) to server 3.

Control unit 470 may be configured to transmit the profiles of all workers to server 3. Alternatively, an attendance record may be stored in storage unit 480, and control unit 470 may be configured to transmit only the profiles of workers who are at office to server 3.

The information transmitted from database server 4 to server 3 is used for server 3 to generate support information described above. Such processing enables terminal device 10 to display, for example, detailed information 1102 on screen 1100 of FIG. 10.

(Data)

FIG. 29 shows an example of remedy manual 431. Referring to FIG. 29, nature of an anomaly, a degree of emergency, and a remedy method are associated with an anomaly identification number in remedy manual 431. The remedy procedure for recovering from each remedy shown in the column for the contents of remedies is described in the column for remedy procedure. The degree of emergency is set in advance based on, for example, the configuration of production facility 900.

FIG. 30 shows an example of ideal work time data 432. Referring to FIG. 30, the ideal work time described above is associated with an anomaly identification number in ideal work time data 432. Note that an ideal work time may be included in remedy manual 431.

FIG. 31 shows an example of profile data 481. Referring to FIG. 31, information on skills possessed, past career (experience), and the like are associated with a worker (specifically, an identification number of a worker) in profile data 481. A language used, an age, and an attendance record may be associated with a worker.

FIG. 32 shows an example of remedy history data 482. Referring to FIG. 32, a date of occurrence of an anomaly, contents of a remedy, and a worker who was in charge of the anomaly, and a required time are associated with an anomaly identification number in remedy history data 482.

As described above, server 3 creates a Web page to be downloaded into terminal device 10 using remedy manual 431 shown in FIG. 29, ideal work time data 432 shown in FIG. 30, profile data 481 shown in FIG. 31, and remedy history data 482 shown in FIG. 32. This allows terminal device 10 to display various screens (support screens) described above.

<Notes>

[Configuration 1]

A work support system (1) including:
a controller system (500) of a production facility (900);
an information processor (700) communicable with the controller system (500); and
a plurality of first terminal devices (20), each of which is communicable with the information processor (700), wherein
upon receipt of a signal indicating occurrence of a plurality of anomalies in the controller system (500) from the controller system (500), the information processor (700) displays nature of the plurality of anomalies,
after displaying the nature of the plurality of anomalies, the information processor (700) accepts, for each anomaly, an input operation for assignment of a worker who is to handle the anomaly among a plurality of workers,
upon acceptance of the input operation, the information processor (700) notifies, based on the assignment, a first terminal device (20) used by the worker of nature of the anomaly to be handled by the worker;
upon acceptance of the nature of the anomaly from the information processor (700), each first terminal device (20) displays contents of a remedy for the anomaly,
upon acceptance of an input operation for inputting progress information indicating progress of the remedy, each first terminal device (20) transmits the progress information to the information processor (700),
upon receipt of the progress information from the first terminal device (20), the information processor (700) displays the progress information,
after displaying the progress information, the information processor (700) further accepts an input operation for updating the assignment of a worker who is to handle each anomaly, and
based on the assignment updated, the information processor (700) notifies a first terminal device (20) used by the worker of the nature of the anomaly to be handled by the worker.

[Configuration 2]

The work support system (1) according to configuration 1, wherein
the information processor (700) displays support information for supporting the assignment of a worker, and
the support information includes at least one of location information of each worker, skill information indicating a skill of each worker, experience information indicating work experience of each worker, occurrence location information indicating a location of occurrence of each anomaly, a degree of emergency of each anomaly, and an ideal number of workers required for handling each anomaly.

[Configuration 3]

The work support system (1) according to configuration 2, wherein
the controller system (500) includes a programmable logic controller (511, 521),
the information processor (700) includes
a server device (750) communicably connected to the programmable logic controller (511, 521) and each first terminal device (20), and
a second terminal device (10) communicable with the server device (750), the second terminal device (10) further accepts an input operation for setting a target time to recover from the plurality of anomalies that have occurred in the controller system (500), the server device (750) stores the support information and ideal time information indicating, for each anomaly, an ideal work time to recover from the anomaly, the server device (750) determines, based on the ideal time information, whether or not work to recover from the plurality of anomalies that have occurred in the controller system (500) is to complete within the target time set in the second terminal device (10), and the second terminal device (10) displays a result of the determination by the server device (750).

[Configuration 4]

The work support system (1) according to configuration 3, wherein when it is determined that the work to recover from the plurality of anomalies is not to complete within the target time, the second terminal device (10) further accepts an input operation for changing the assignment of a worker.

[Configuration 5]

The work support system (1) according to configuration 3 or 4, wherein based on required time information indicating a time required for each worker to arrive at the location of occurrence of the anomaly and the ideal time information, the server device (750) determines whether or not the work to recover from the plurality of anomalies that have occurred in the controller system (500) is to complete within the target time.

[Configuration 6]

The work support system (1) according to any one of configurations 3 to 5, wherein the first terminal device (20) displays the ideal work time required for recovering, by the worker who uses the first terminal device (20), from the anomaly to be handled by the worker.

[Configuration 7]

The work support system (1) according to any one of configurations 1 to 6, wherein upon acceptance of the nature of the anomaly from the information processor (700), the first terminal device (20) performs a display for inquiring of the worker whether or not the worker is able to handle the anomaly, upon input of a response to the inquiry, the first terminal device (20) transmits the response to the information processor (700), and the information processor (700) displays the response.

[Configuration 8]

The work support system (1) according to any one of configurations 1 to 7, wherein the information processor (700) displays a list of the plurality of anomalies, the information processor (700) determines, based on the progress information, whether or not recovery from each anomaly has been performed, and in displaying of the list, the information processor (700) displays items for the anomaly, recovery from which is determined to have been performed, differently from items for the anomaly, recovery from which is determined to have not been performed.

[Configuration 9]

The work support system (1) according to any one of configurations 1 to 8, wherein each first terminal device (20) displays a text box for transmitting a message, and each first terminal device (20) transmits the message input in the text box to the information processor (700).

[Configuration 10]

The work support system (1) according to any one of configurations 1 to 9, wherein each first terminal device (20) displays contents of remedies for the anomalies in a form of a checklist, and the input operation for inputting the progress information is a check operation to the checklist.

[Configuration 11]

An information processor (700) communicable with a controller system (500) of a production facility and a plurality of terminal devices (20), the information processor (700) including:

receiving means (412) configured to receive, from the controller system (500), a signal indicating occurrence of a plurality of anomalies in the controller system (500);

display means (182) configured to display nature of the plurality of anomalies;

acceptance means (184) configured to accept, for each anomaly, an input operation for assignment of a worker who is to handle the anomaly among a plurality of workers after the display of the nature of the plurality of anomalies; and transmission means (411, 412) configured to notify, upon acceptance of the input operation and based on the assignment, a terminal device (20) used by the worker of nature of the anomaly to be handled by the worker, wherein the receiving means (412) further receives progress information indicating progress of a remedy for the anomaly from each terminal device (20), upon receipt of the progress information, the display means (182) displays the progress information, the acceptance means (184) further accepts, after displaying the progress information, an input operation for updating the assignment of a worker who is to handle each anomaly, and based on the assignment updated, the transmission means (411, 181) notifies the terminal device used by the worker of the nature of the anomaly to be handled by the worker.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 1 work support system; 3, 750 server; 4 database server; 6, 6A, 6B, 6C wireless router; 10, 20, 20A, 20B, 20C terminal device; 500 controller system; 510 first line system; 512, 514, 522, 524 remote IO device; 513, 523 image sensor; 512P1, 512P2, 514P1, 514P2, 522P1, 522P2, 524P1, 524P2 communication port; 515, 525 arm robot; 519, 529 hub; 520 second line system; 610, 620 processing machine; 691, 692 conveyor belt; 693 mounting table; 700 information processor; 810, 820 driving device; 900 production facility; 1000 facility system; 1078, 1082, 1151, 1152, 1153, 1154, 1155, 1156, 1157, 1201, 1202, 1203, 2121, 2122, 2124, 2126, 2135 object image; 1070, 1080, 1090, 1100, 1110, 1150, 1158, 1159, 1160, 1170, 1200, 1210, 2120, 2130, 2140, 2190 screen; 1071, 1071A, 1076, 1077, 1079, 1079A, 1163 icon; 1081, 1091, 1111, 1171, 1211 trouble list; 1102 detailed information; 1103 worker list; 1181 progress table; 2123, 2133, 2143, 2193 list; 2125 floor map; 2134 message I/O field; N1, N21, N22, N31, N32, N41, N42 network; W workpiece.

The invention claimed is:

1. A work support system comprising:
a controller system of a production facility;
an information processor communicable with the controller system; and
a plurality of first terminal devices, each of which is communicable with the information processor, wherein
upon receipt of a signal indicating occurrence of a plurality of anomalies in the controller system from the controller system, the information processor displays nature of the plurality of anomalies,
after displaying the nature of the plurality of anomalies, the information processor accepts, for each anomaly, an input operation for assignment of a worker who is to handle the anomaly among a plurality of workers,
upon acceptance of the input operation, the information processor notifies, based on the assignment, a first terminal device used by the worker of nature of the anomaly to be handled by the worker;
upon acceptance of the nature of the anomaly from the information processor, each first terminal device displays contents of a remedy for the anomaly,
upon acceptance of an input operation for inputting progress information indicating progress of the remedy, each first terminal device transmits the progress information to the information processor,
upon receipt of the progress information from the first terminal device, the information processor displays the progress information,
after displaying the progress information, the information processor further accepts an input operation for updating the assignment of a worker who is to handle each anomaly, and
based on the assignment updated, the information processor notifies the first terminal device used by the worker of the nature of the anomaly to be handled by the worker.

2. The work support system according to claim 1, wherein
the information processor displays support information for supporting the assignment of a worker, and
the support information includes at least one of location information of each worker, skill information indicating a skill of each worker, experience information indicating work experience of each worker, occurrence location information indicating a location of occurrence of each anomaly, a degree of emergency of each anomaly, and an ideal number of workers required for handling each anomaly.

3. The work support system according to claim 2, wherein
the controller system includes a programmable logic controller,
the information processor includes
a server device communicably connected to the programmable logic controller and each first terminal device, and
a second terminal device communicable with the server device,
the second terminal device further accepts an input operation for setting a target time to recover from the plurality of anomalies that have occurred in the controller system,
the server device stores the support information and ideal time information indicating, for each anomaly, an ideal work time to recover from the anomaly,
the server device determines, based on the ideal time information, whether or not work to recover from the plurality of anomalies that have occurred in the controller system is to complete within the target time set in the second terminal device, and
the second terminal device displays a result of the determination by the server device.

4. The work support system according to claim 3, wherein when it is determined that the work to recover from the plurality of anomalies is not to complete within the target time, the second terminal device further accepts an input operation for changing the assignment of a worker.

5. The work support system according to claim 3, wherein based on required time information indicating a time required for each worker to arrive at the location of occurrence of the anomaly and the ideal time information, the server device determines whether or not the work to recover from the plurality of anomalies that have occurred in the controller system is to complete within the target time.

6. The work support system according to claim 3, wherein the first terminal device displays the ideal work time required for recovering, by the worker who uses the first terminal device, from the anomaly to be handled by the worker.

7. The work support system according to claim 1, wherein
upon acceptance of the nature of the anomaly from the information processor, the first terminal device performs a display for inquiring of the worker whether or not the worker is able to handle the anomaly,
upon input of a response to the inquiry, the first terminal device transmits the response to the information processor, and
the information processor displays the response.

8. The work support system according to claim 1, wherein
the information processor displays a list of the plurality of anomalies,
the information processor determines, based on the progress information, whether or not recovery from each anomaly has been performed, and
in displaying of the list, the information processor displays items for the anomaly, recovery from which is determined to have been performed, differently from items for the anomaly, recovery from which is determined to have not been performed.

9. The work support system according to claim 1, wherein
each first terminal device displays a text box for transmitting a message, and
each first terminal device transmits the message input in the text box to the information processor.

10. The work support system according to claim 1, wherein
each first terminal device displays contents of remedies for the anomalies in a form of a checklist, and
the input operation for inputting the progress information is a check operation to the checklist.

11. An information processor communicable with a controller system of a production facility and a plurality of terminal devices, the information processor comprising:
receiving means configured to receive, from the controller system, a signal indicating occurrence of a plurality of anomalies in the controller system;
display means configured to display nature of the plurality of anomalies;
acceptance means configured to accept, for each anomaly, an input operation for assignment of a worker who is to handle the anomaly among a plurality of workers after the display of the nature of the plurality of anomalies; and transmission means configured to notify, upon acceptance of the input operation and based on the assignment, a terminal device used by the worker of nature of the anomaly to be handled by the worker, wherein the receiving means further receives progress information indicating progress of a remedy for the anomaly from each terminal device, upon receipt of the progress information, the display means displays the progress information, the acceptance means further accepts, after displaying the progress information, an input operation for updating the assignment of a worker who is to handle each anomaly, and based on the assignment updated, the transmission means notifies the terminal device used by the worker of the nature of the anomaly to be handled by the worker.

12. A work support method comprising:

upon receipt of a signal indicating occurrence of a plurality of anomalies in a controller system of a production facility from the controller system, displaying, by an information processor communicable with the controller system, nature of the plurality of anomalies;

after displaying the nature of the plurality of anomalies, accepting, by the information processor and for each anomaly, an input operation for assignment of a worker who is to handle the anomaly among a plurality of workers;

upon acceptance of the input operation and based on the assignment, notifying, by the information processor, a terminal device used by the worker of nature of the anomaly to be handled by the worker;

upon acceptance of the nature of the anomaly from the information processor, displaying, by each of the plurality of terminal devices communicable with the information processor, contents of a remedy for the anomaly;

upon acceptance of an input operation for inputting progress information indicating progress of the remedy, transmitting the progress information to the information processor by each terminal device;

upon receipt of the progress information from the terminal device, displaying the progress information by the information processor;

after displaying the progress information, further accepting, by the information processor, an input operation for updating the assignment of a worker who is to handle each anomaly; and based on the assignment updated, notifying, by the information processor, the terminal device used by the worker of the nature of the anomaly to be handled by the worker.

\* \* \* \* \*